(12) United States Patent
Gonzalez

(10) Patent No.: US 11,582,508 B2
(45) Date of Patent: Feb. 14, 2023

(54) PERSONAL AREA NETWORK PROXY SERVICE FOR VIDEO SYSTEMS

(71) Applicant: BluTether Limited, Hamilton (BM)

(72) Inventor: George E. Gonzalez, McLean, VA (US)

(73) Assignee: BLUTETHER LIMITED, Hamilton (BM)

( * ) Notice: Subject to any disclaimer, the term of this patent is extended or adjusted under 35 U.S.C. 154(b) by 0 days.

(21) Appl. No.: 16/860,452

(22) Filed: Apr. 28, 2020

(65) Prior Publication Data
US 2020/0260140 A1 Aug. 13, 2020

Related U.S. Application Data

(60) Division of application No. 15/192,781, filed on Jun. 24, 2016, now Pat. No. 10,638,190, which is a
(Continued)

(51) Int. Cl.
| | | |
|---|---|---|
| H04N 21/4363 | (2011.01) | |
| H04N 21/41 | (2011.01) | |
| H04N 21/61 | (2011.01) | |
| H04N 21/472 | (2011.01) | |
| H04L 69/16 | (2022.01) | |

(Continued)

(52) U.S. Cl.
CPC ....... *H04N 21/43637* (2013.01); *H04L 69/16* (2013.01); *H04N 21/25875* (2013.01); *H04N 21/4126* (2013.01); *H04N 21/47202* (2013.01); *H04N 21/6143* (2013.01);
(Continued)

(58) Field of Classification Search
CPC .............. H04N 21/20; H04N 21/2408; H04N 21/44204; H04N 21/44218; H04N 21/44213; H04N 21/4532; H04N 21/43637; H04N 21/4126; H04N 21/47202;
(Continued)

(56) References Cited

U.S. PATENT DOCUMENTS

| | | |
|---|---|---|
| 5,884,190 A | 3/1999 | Lintula et al. |
| 8,938,747 B2 | 1/2015 | Huffman et al. |

(Continued)

FOREIGN PATENT DOCUMENTS

| | | |
|---|---|---|
| CN | 101605332 A | 12/2009 |
| CN | 102368831 A | 3/2012 |

(Continued)

OTHER PUBLICATIONS

Office Action for U.S. Appl. No. 15/192,809, dated Sep. 23, 2020.
(Continued)

*Primary Examiner* — Nnenna N Ekpo
(74) *Attorney, Agent, or Firm* — Thompson Coburn LLP

(57) ABSTRACT

Techniques where a computing device such as a smart phone can be leveraged to facilitate ratings data capture through a set top box ("STB") associated with a content subscription service such as satellite television are described. In an exemplary embodiment, STB channel data can be communicated to the computing device via a personal area network ("PAN") connection such as Bluetooth. The computing device in turn can forward the STB channel data to a remote server over a wide area network ("WAN").

29 Claims, 15 Drawing Sheets

Related U.S. Application Data continuation-in-part of application No. 14/138,479, filed on Dec. 23, 2013, now Pat. No. 9,467,738.

(51) Int. Cl.
*H04W 4/80* (2018.01)
*H04N 21/258* (2011.01)
*H04N 21/658* (2011.01)

(52) U.S. Cl.
CPC ..... *H04N 21/6175* (2013.01); *H04N 21/6181* (2013.01); *H04N 21/6582* (2013.01); *H04W 4/80* (2018.02)

(58) Field of Classification Search
CPC ........... H04N 21/6143; H04N 21/6175; H04N 21/6181; H04N 21/6582; H04W 4/80; H04L 69/16
See application file for complete search history.

(56) References Cited

U.S. PATENT DOCUMENTS

| | | | |
|---|---|---|---|
| 9,179,185 B2 * | 11/2015 | Fry | H04W 64/003 |
| 9,467,738 B2 | 10/2016 | Gonzalez | |
| 10,638,190 B2 | 4/2020 | Gonzalez | |
| 2002/0032904 A1 | 3/2002 | Lerner | |
| 2003/0045955 A1 | 3/2003 | Janik | |
| 2004/0031045 A1 * | 2/2004 | Ivanyi | H04N 21/25891 725/14 |
| 2004/0083485 A1 | 4/2004 | Russ et al. | |
| 2005/0216941 A1 | 9/2005 | Flanagan et al. | |
| 2007/0124779 A1 | 5/2007 | Casey et al. | |
| 2007/0162930 A1 | 7/2007 | Mickle et al. | |
| 2007/0171854 A1 | 7/2007 | Chen et al. | |
| 2007/0180485 A1 | 8/2007 | Dua | |
| 2008/0147882 A1 * | 6/2008 | Reif | H04W 8/183 709/238 |
| 2009/0070828 A1 | 3/2009 | Stomakhin et al. | |
| 2009/0228945 A1 | 9/2009 | Yaussy | |
| 2009/0233715 A1 | 9/2009 | Ergen et al. | |
| 2009/0320077 A1 | 12/2009 | Gazdzinski | |
| 2010/0016011 A1 | 1/2010 | Alen | |
| 2010/0037057 A1 | 2/2010 | Shim et al. | |
| 2010/0061294 A1 * | 3/2010 | Proctor, Jr. | G06Q 30/0261 370/328 |
| 2010/0087167 A1 | 4/2010 | Tsurutome et al. | |
| 2010/0146601 A1 | 6/2010 | Bunch et al. | |
| 2010/0153983 A1 | 6/2010 | Philmon et al. | |
| 2010/0267368 A1 | 10/2010 | Masputra | |
| 2011/0014899 A1 * | 1/2011 | Cugnini | H04N 21/4586 455/414.1 |
| 2011/0035766 A1 | 2/2011 | Reynolds | |
| 2011/0074794 A1 | 3/2011 | Felt et al. | |
| 2011/0112969 A1 | 5/2011 | Zaid et al. | |
| 2011/0246567 A1 | 10/2011 | Cedervall et al. | |
| 2011/0307188 A1 | 12/2011 | Peng et al. | |
| 2012/0014464 A1 | 1/2012 | Eiger et al. | |
| 2012/0039248 A1 | 2/2012 | Schneider et al. | |
| 2012/0044057 A1 * | 2/2012 | Kang | H04L 69/14 340/10.4 |
| 2012/0046013 A1 | 2/2012 | Bauman | |
| 2012/0047549 A1 | 2/2012 | Brown et al. | |
| 2012/0151006 A1 | 6/2012 | McInerney et al. | |
| 2012/0159338 A1 | 6/2012 | Mountanos et al. | |
| 2012/0191481 A1 | 7/2012 | Kaminski et al. | |
| 2012/0254931 A1 | 10/2012 | Oztaskent et al. | |
| 2012/0266200 A1 | 10/2012 | Dasher et al. | |
| 2012/0316414 A1 | 12/2012 | Greene | |
| 2012/0330950 A1 | 12/2012 | Pichumani et al. | |
| 2013/0031268 A1 | 1/2013 | Pope et al. | |
| 2013/0035086 A1 | 2/2013 | Chardon et al. | |
| 2013/0041951 A1 | 2/2013 | Lee et al. | |
| 2013/0042263 A1 | 2/2013 | Reynolds | |
| 2013/0139196 A1 | 5/2013 | Sokolov et al. | |
| 2013/0145406 A1 | 6/2013 | Baskaran et al. | |
| 2013/0160044 A1 | 6/2013 | Mathews et al. | |
| 2013/0227284 A1 | 8/2013 | Pleffer et al. | |
| 2013/0282438 A1 | 10/2013 | Hunter et al. | |
| 2013/0322496 A1 | 12/2013 | Park et al. | |
| 2013/0347025 A1 | 12/2013 | Prakash et al. | |
| 2014/0344843 A1 * | 11/2014 | Givon | H04N 21/4126 725/14 |
| 2014/0351834 A1 | 11/2014 | Srivastav et al. | |
| 2014/0358734 A1 | 12/2014 | Sehgal et al. | |
| 2015/0081904 A1 | 3/2015 | Guedalia et al. | |
| 2016/0309281 A1 | 10/2016 | Lee | |
| 2017/0278020 A1 | 9/2017 | Noe et al. | |
| 2018/0129357 A9 | 5/2018 | Imes et al. | |

FOREIGN PATENT DOCUMENTS

| | | |
|---|---|---|
| CN | 102905172 A | 1/2013 |
| CN | 203057206 U | 7/2013 |
| EP | 2360922 A2 | 8/2011 |
| EP | 2632107 A1 | 8/2013 |
| FR | 2934109 A1 | 1/2010 |
| JP | 2001309288 A | 11/2001 |
| JP | 2002-135813 A | 5/2002 |
| JP | 2003-32659 A | 1/2003 |
| JP | 2003-244731 A | 8/2003 |
| JP | 2004-102802 A | 4/2004 |
| JP | 2005134081 A | 5/2005 |
| JP | 201039642 A | 2/2010 |
| JP | 2010524405 A | 7/2010 |
| KR | 20040022724 A | 3/2004 |
| WO | 0221835 A1 | 3/2002 |
| WO | 12071840 A1 | 6/2012 |
| WO | 2013/081611 A1 | 6/2013 |

OTHER PUBLICATIONS

Austrailia Office Action for 2014369865 dated Apr. 26, 2018.
EPO Examination Report for 14873846.1 dated Jul. 24, 2018.
Extended European Search Report for Application 14873846.1 dated Jul. 12, 2017.
Phillippines Examination Report for 1/2016/501240 dated May 4, 2018.
Prosecution History for U.S. Appl. No. 14/138,479, now U.S. Pat. No. 9,467,738, filed Dec. 23, 2013.
Singapore Search Report for Application 11201605177Y dated Aug. 18, 2017.
Translation of Office Action for JP 2016-543159 dated Oct. 29, 2018.
Prosecution History for U.S. Appl. No. 15/192,781, now U.S. Pat. No. 10,638,190, filed Jun. 24, 2016.

* cited by examiner

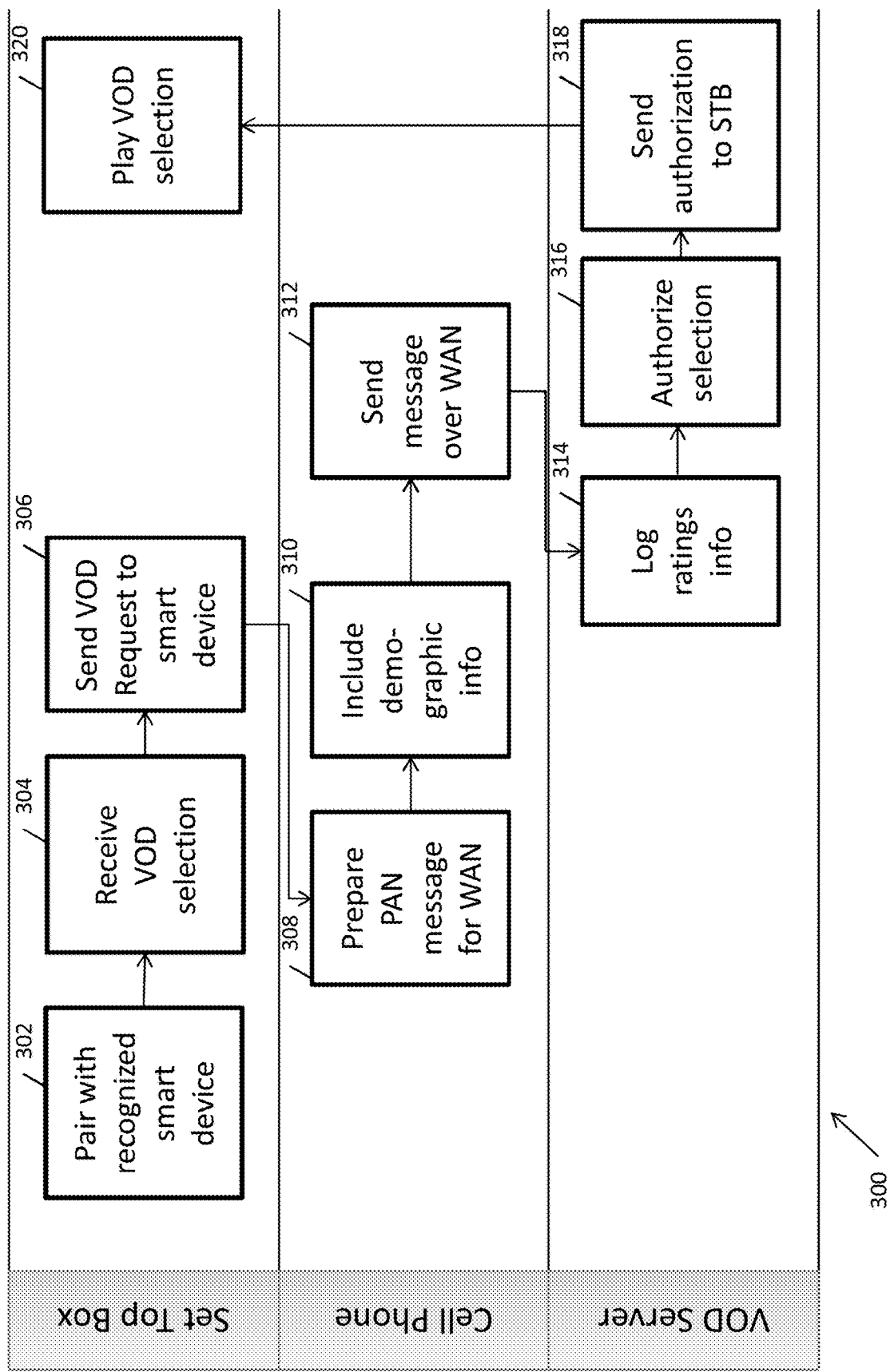

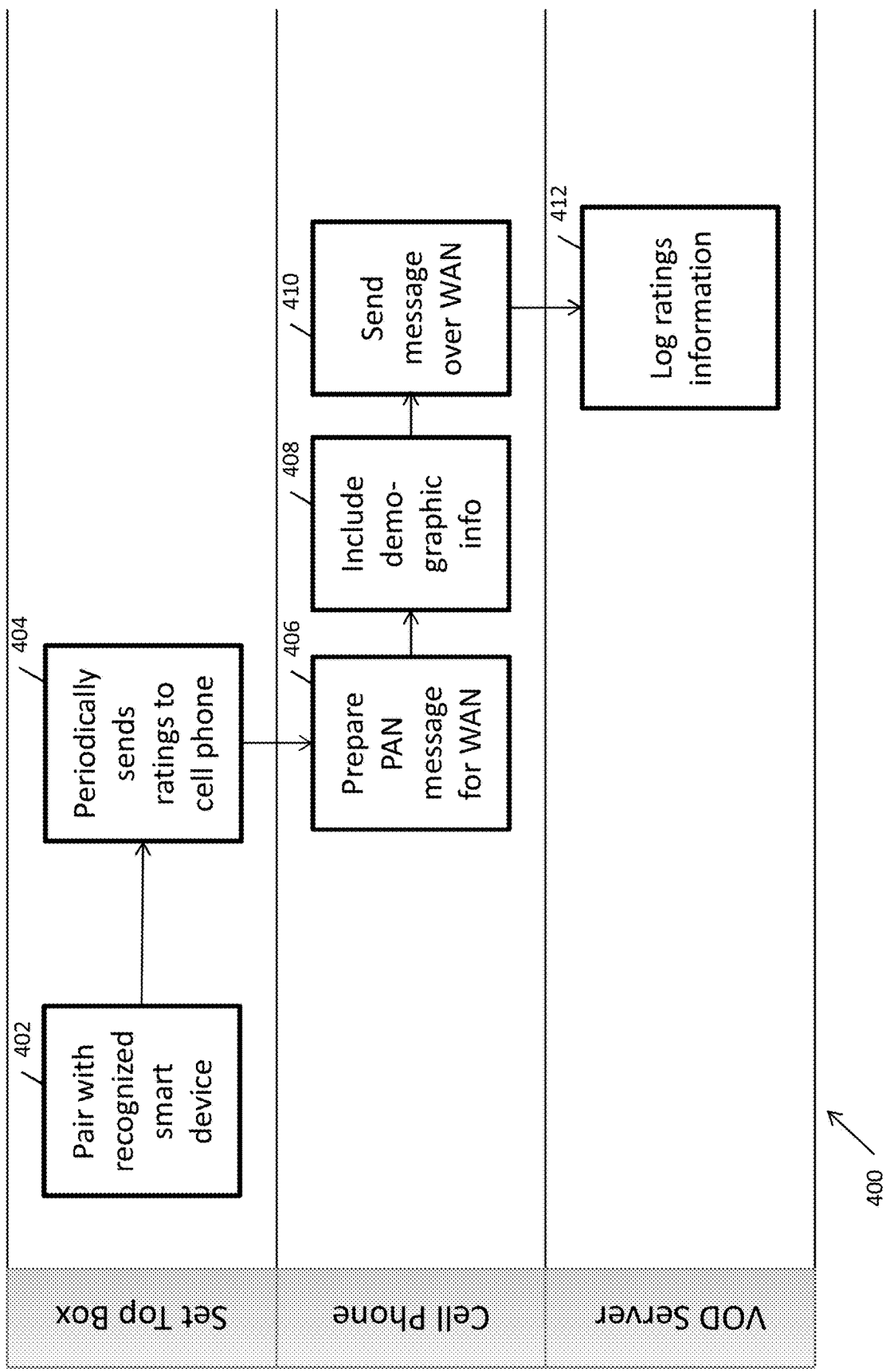

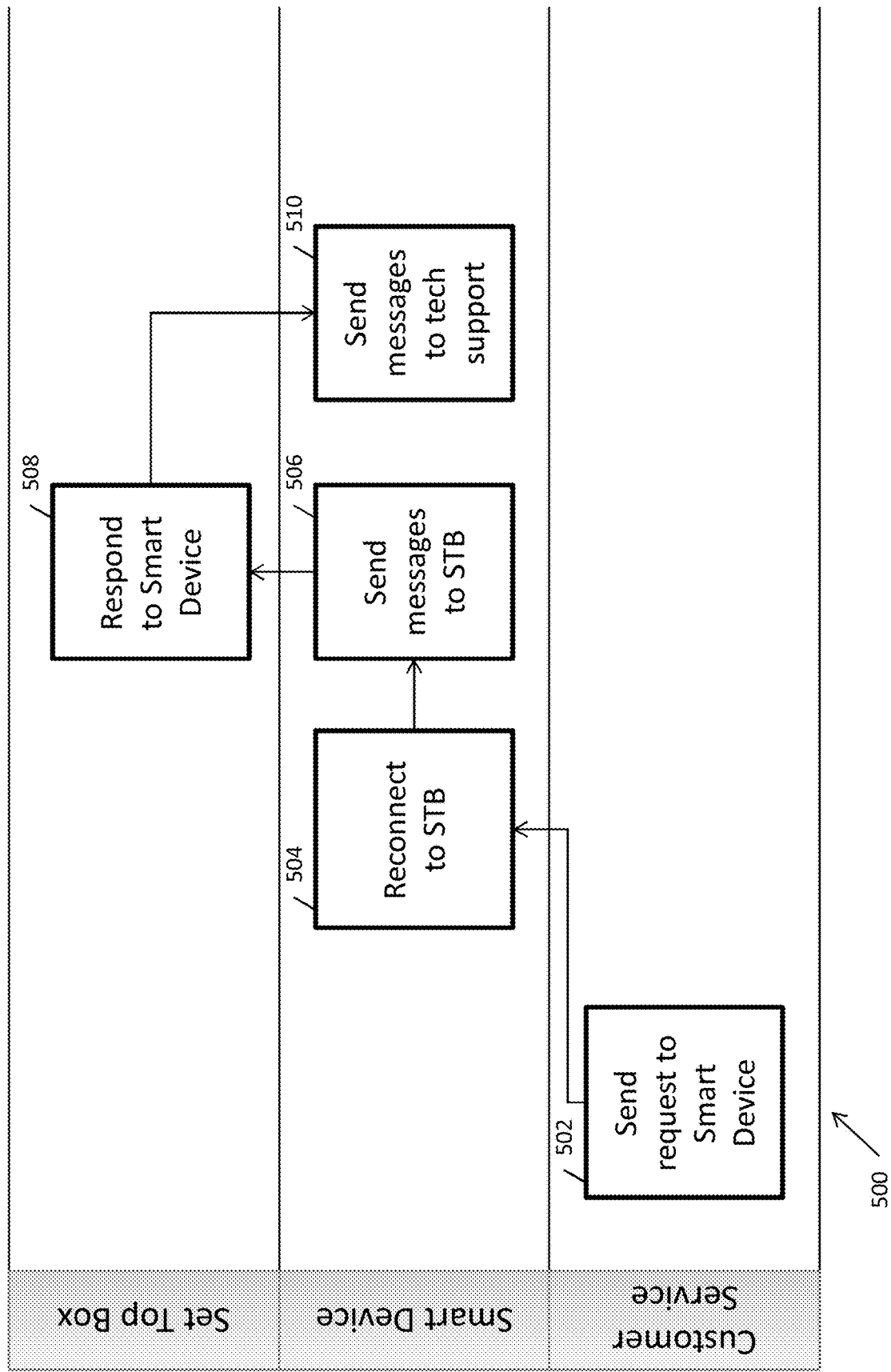

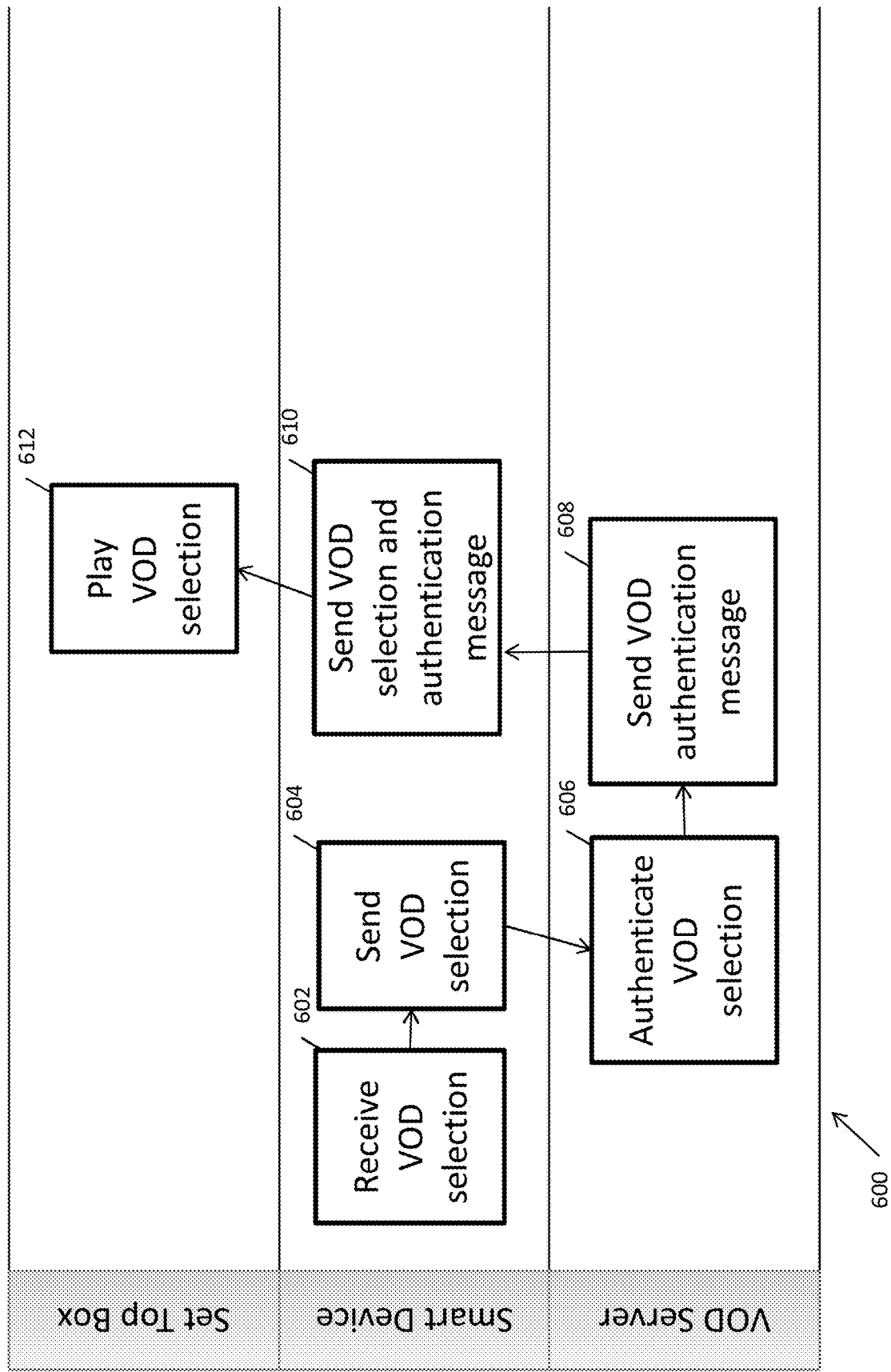

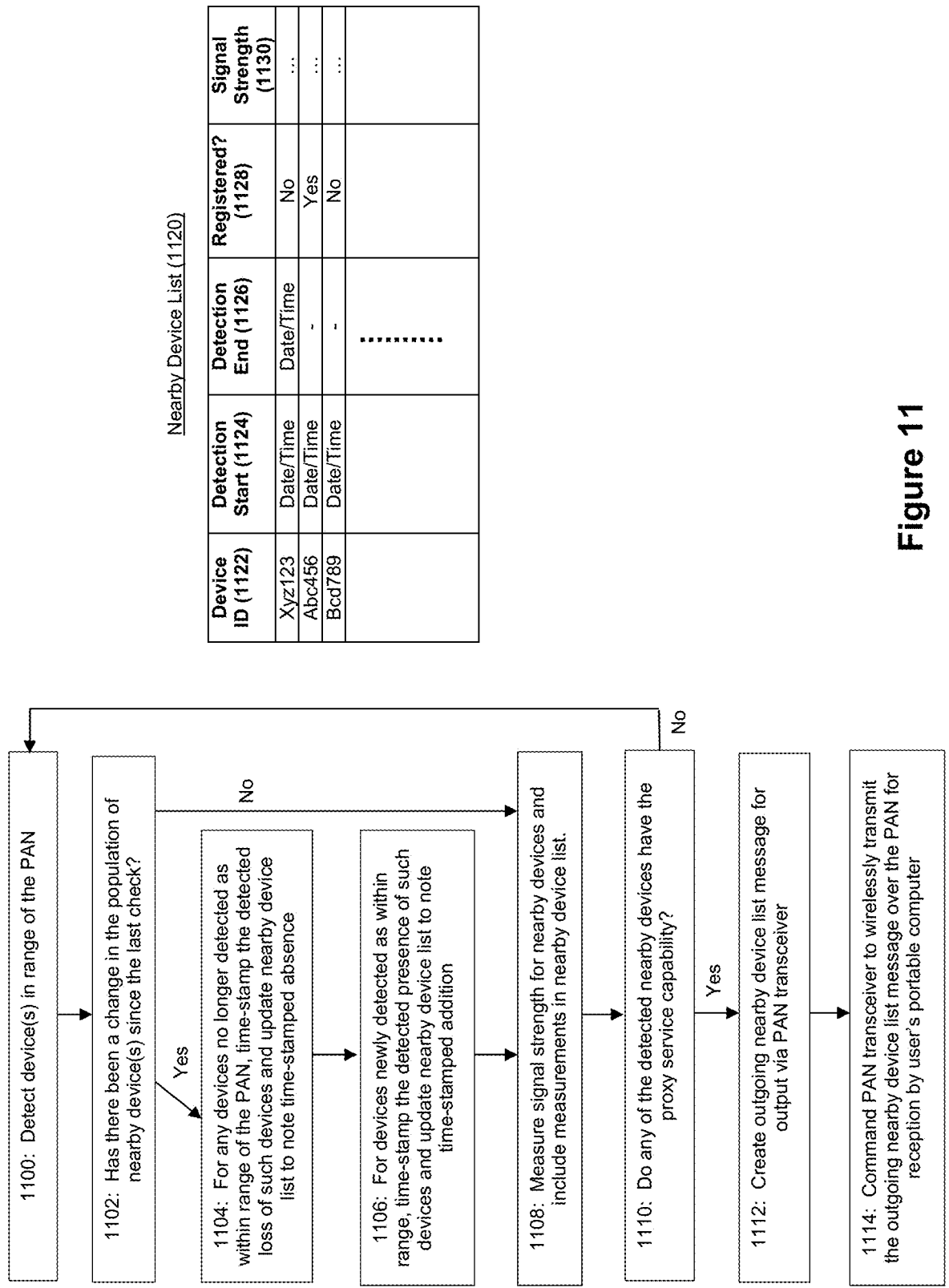

PERSONAL AREA NETWORK PROXY SERVICE FOR VIDEO SYSTEMS

CROSS-REFERENCE AND PRIORITY CLAIM TO RELATED PATENT APPLICATIONS

This patent application is a divisional of U.S. patent application Ser. No. 15/192,781, filed Jun. 24, 2016, entitled "Personal Area Network Proxy Service for Video Systems", now U.S. Pat. No. 10,638,190, which is a continuation-in-part of U.S. patent application Ser. No. 14/138,479, filed Dec. 23, 2013, entitled "Personal Area Network Proxy Service for Video on Demand Systems", now U.S. Pat. No. 9,467,738, the entire disclosures of each of which are incorporated herein by reference.

This patent application is also related to U.S. patent application Ser. No. 15/192,809, filed Jun. 24, 2016, entitled "Personal Area Network Proxy Service for Video on Demand and Other Systems", the entire disclosure of which is incorporated herein by reference.

INTRODUCTION

Many consumer devices, such as televisions, Blu-ray players, automobiles, refrigerators, thermostats, and the like, do not have access to the Internet. Many of these consumer devices are capable of network communication, but cannot access a wide area network, such as the Internet, without a gateway or a carrier provided plan. Giving these consumer devices access to the Internet would provide much greater functionality. Conventionally, providing Internet access to consumer electronics required a user to purchase additional service accounts from service providers, which increased customer cost. There is needed in the art a method for providing consumer electronics Internet connection without increasing cost to the customer.

One such example of a consumer device needing Internet access is a set top box ("STB") offering Video on demand ("VOD") services. VOD is a system and service offered by many cable and satellite providers that allow viewers to select and watch videos on demand. After a user makes a VOD selection, VOD media may be streamed or downloaded to a viewer's STB. Conventional STBs generally provide viewers with access to a VOD channel or menu where viewers may search for and find television programs, movies, or other videos. Some programs may be free or included with the viewer's cable or satellite subscription, while other programs may be pay-per-view or rented. Like any traditional DVD movie, VOD selections and purchases require a specific license from the content producer (e.g. Hollywood studio), which may be acquired through a subscription or bought when the media is rented or purchased. Generally, cable and satellite providers acquire licenses from the content producers on behalf of their customers. So, cable and satellite providers must track VOD selections as a condition of licensing agreements with content producers.

Typically, cable and satellite service providers are required by content studios to authenticate VOD rentals and purchase selections by authenticating the VOD selections through a two-way communication medium. To track VOD selections, cable and satellite providers receive a communication from the STB notifying the cable or satellite provider that the user has selected VOD content. More specifically, conventional VOD uses a two-way communication medium where content is sent to the viewer's STB and messages about VOD purchases and selections are received from the viewer's STB. For cable television providers, the requisite two-way communication already exists in the coaxial cable connection between the STB and the cable company. The same is true for newer, fiber optic-based content provider companies (e.g. Verizon FIOS). However, satellite companies have a problem because satellite dishes are generally unidirectional in that they are capable of receiving satellite communications from the satellite provider's satellite but they are not configured to send data from the STB back to the provider via the satellite link.

Satellite companies in countries that have a pre-existing infrastructure that supports wired communications, such as the United States and Canada, assume that most households have an internet connection, which is generally a broadband connection. So, the two-way communication problem is solved by connecting the STB to the household's internet connection, such as through an Ethernet port or a Wi-Fi network. While this solution works well in countries where broadband is prevalent, some countries, such as India and Indonesia, do not have wide-spread availability of landline or broadband connections because they lack the necessary infrastructure. These developing countries largely skipped the cable laying development process and instead opted for mainly wireless connections, such as cellular connections. So, in countries such as India or Indonesia, many people do not have access to a broadband connection simply because of the expense to lay the cables where large segments of the population live. As a result, the conventional satellite VOD solution whereby the STB is connected to a broadband link would fail to help large segments of the population.

Two conventional satellite VOD procedures that avoid the need for a wired broadband have been attempted. First, an SMS text messaging-based procedure was attempted. When a viewer decided upon a VOD program, the STB generated a notification instructing the viewer to text a program-specific code to the satellite provider's VOD phone number. After receiving the SMS, the satellite provider responded with a message that included an authorization code. The user then inputted the authorization code into the STB, and the selected program would eventually begin playing. This procedure was frustrating to the viewer because it required the viewer to perform cumbersome steps involving drafting and sending a text message and inputting an authorization code into the STB. This procedure also caused problems for the satellite provider because authorization codes could be shared among viewers, and some viewers were able to watch programs illegally using the shared code without acquiring a license.

The second conventional satellite VOD procedure that avoids the need for a wired broadband used inserted a GSM cellular module into the STB. The STB would use the GSM module to send a cellular communication to the satellite provider notifying the satellite provider of the selected VOD program so that a license could be acquired for the viewer. While this procedure limited the number of cumbersome steps for the viewer, it greatly increased the service provider and viewer cost. First, the GSM module made the STB more expensive for the viewer or the satellite company to buy, and the viewer needed to purchase a service plan from a cellular provider merely to enable their STB to communicate wirelessly via the GSM module. The service plan added another monthly charge to an already expensive television subscription.

In view of the shortcomings of these known VOD techniques, the inventors believe that a need in the art exists for different and improved technologies to support VOD service.

Toward this end, the inventors disclose a number of exemplary embodiments whereby a wireless personal area network is used to notify a content provider of VOD selections.

For example, a computing device with its own wireless networking capabilities such as a smart phone, tablet computer, or iPod can be used as a proxy through which the STB can communicate requests for VOD content and/or the Internet to a remote server that determines whether the VOD content request should be granted. The computing device can have both a personal area network ("PAN") connection and a wide area network ("WAN") connection. The PAN connects the computing device to the STB using any PAN technology (e.g., Bluetooth low energy ("BLE") or Zigbee). The WAN connects the computing device to the Internet, and more specifically, to a satellite provider VOD server through the WAN. The computing device can execute an application (an "app") to make the computing device serve as a proxy for sending messages sent from a consumer device connected to the computing device through the PAN and in essence "tethering" the consumer device to the Internet via the App on the computing device that has access to both PAN and WAN communications. According to this method, a viewer's existing cellular data service plan and connection associated with his/her computing device can be leveraged so that no additional service plans are required for the viewer to send messages from the consumer device to a remote server through the WAN. The computing device creates the proxy service and extends WAN connection to the consumer device without a tethering plan provided by a carrier and without making any phone calls.

Also, in some exemplary embodiments, a PAN transceiver can be added to the STB to enable the STB to support PAN-based communication with the computing device.

In one embodiment, a system for authorizing VOD purchases comprises: an STB configured to receive commands and selections from a user, generate a VOD authorization request in response to a VOD selection from a user, and play the VOD selection in response to receipt of an authorization message; a PAN transceiver unit in communication with the STB, wherein the PAN transceiver is configured to send the VOD authorization request or other messages from the STB over a PAN connection according to a PAN protocol in response to a command from the STB; a computing device comprising a processor, a memory, a PAN transceiver, and a WAN transceiver, wherein the computing device's processor is configured to execute computer readable instructions defined by an application installed on the computing device and stored in the computing device's memory, wherein the instructions are configured to (1) receive the VOD authorization request or other messages over the PAN from the PAN transceiver unit through the computing device's PAN transceiver and (2) send the VOD authorization request or other messages over a WAN according to a WAN protocol; and a VOD authorization server configured to (1) receive the VOD authorization request over the WAN from the computing device, (2) generate the authorization message, and (3) send the authorization message.

In another embodiment, a method for authorizing VOD purchases comprises: receiving, by an STB, a selection of VOD content from a viewer; establishing a PAN connection between the STB and a computing device within a wireless range of a PAN transceiver that communicates with the STB, wherein the computing device and the STB re-establish the PAN connection when either the STB or the computing device detects presence of the other device to re-establish the PAN connection automatically; sending, by the STB, a VOD request message to the computing device over the PAN, wherein the VOD request message at least describes the VOD content selection from the viewer; sending, by the computing device, the VOD request message over a WAN to a VOD authorization server after receiving the VOD request message over the PAN; and beginning playback, by the STB, of the selected VOD content after the VOD authorization server authenticates the VOD selection.

In another embodiment, a computer program product comprises: a plurality of processor-executable instructions, the instructions being resident on a non-transitory computer-readable storage medium of a computing device and being configured, upon execution by a processor, to: pair the computing device with a second device via a PAN connection; receive a message from the second device over the PAN connection; reassemble the received message according PAN protocols; assemble the received message according to a WAN protocol; and send the received message to a remote server over a WAN connection according to the WAN protocol.

In another embodiment, an apparatus comprises: a WAN transceiver configured to send and receive data over a WAN connection; a PAN transceiver configured to establish a PAN connection with an STB; and a processor configured to: establish a PAN connection with the STB via the PAN transceiver; access data that is indicative of a content subscription account; receive data indicative of a VOD content selection; based on the accessed and received data, send data to a remote server via the WAN transceiver and the WAN connection to thereby permit the remote server to determine whether the content subscription account is authorized for viewing the VOD content selection, the sent data comprising (1) data indicative of the VOD content selection, and (2) data indicative of the content subscription account; and wherein the PAN transceiver, the WAN transceiver, and the processor are resident on a member of the group consisting of (1) a smart phone, (2) a tablet computer, and/or (3) a mobile handheld computing device such as an iPod or mobile phone.

In another embodiment, a proxy method for enabling VOD purchases, the method comprises: storing data that is indicative of a content subscription account in a memory; receiving data indicative of a VOD content selection; retrieving the stored data indicative of the content subscription account; in response to the receiving and retrieving steps, sending data to a remote server via a WAN connection to thereby permit the remote server to determine whether the content subscription account is authorized for viewing the VOD content selection, the sent data comprising (1) data indicative of the VOD content selection, and (2) data indicative of the content subscription account; and wherein the method steps are performed by a computing device, the computing device comprising a member of the group consisting of (1) a smart phone, (2) a tablet computer, and/or (3) a mobile handheld computing device.

In another embodiment, a PAN unit comprises: a PAN transceiver configured to establish a PAN connection with a computing device; and a processor configured to (1) receive, from an STB, data indicative of a VOD content selection or other messages, and (2) send data indicative of the VOD content selection to the computing device via the PAN transceiver and the PAN connection to permit the computing device to communicate data indicative of the VOD content selection or other messages to a remote server via the another network connection.

In another embodiment, a proxy method for enabling VOD service, the method comprises: establishing a PAN connection with a computing device; and receiving from a STB, data indicative of a VOD content selection or other messages; sending such data to the computing device via the PAN connection to permit the computing device to communicate the data to a remote server via another network connection; and wherein the method steps are performed by a PAN transceiver unit in communication with the STB.

In another embodiment, a proxy method for enabling VOD purchases or other application messages, the method comprises: establishing a PAN connection with a PAN transceiver associated with a STB; receiving data indicative of a VOD content selection or other messages from the STB via the PAN and the PAN transceiver; sending data to a remote server via a WAN connection to thereby permit the remote server to process the data such as to determine whether a content subscription account associated with the STB is authorized for viewing the VOD content selection, the sent data comprising (1) data indicative of the VOD content selection, (2) data indicative of the content subscription account, and/or (3) other application messages; and wherein the method steps are performed by a computing device, the computing device comprising a member of the group consisting of (1) a smart phone, (2) a tablet computer, and/or (3) a mobile handheld computing device.

In another embodiment, a STB comprises: a PAN transceiver configured to send and receive wireless transmissions over a PAN connection, wherein the PAN transceiver is mounted outside the metal chassis but behind a plastic front bezel of the STB; memory configured to store first computer readable instructions for generating a VOD authorization request in response to a VOD selection from a user or other application messages, second computer-readable instructions for data transmission over the PAN connection, and third computer-readable instructions to play the VOD selection; a processor configured to: (1) execute the first computer-readable instructions to generate a VOD authorization request that includes data indicative of selected VOD content in response to a VOD selection from the user, (2) execute the second computer-readable instructions to (i) assemble data messages according to a PAN protocol and (ii) command the PAN transceiver to send the VOD authorization request, and (3) execute the third computer-readable instructions in response to a notification that the selected VOD content has been authorized.

In yet another embodiment, a method for enabling VOD purchases for an STB using a computing device as a proxy, the method comprises: establishing a PAN connection with a computing device; receiving data indicative of a VOD content selection or other application messages; sending data indicative of the VOD content selection or other application messages to the computing device via the PAN connection to permit the computing device to communicate the data to a remote server via another network connection; and wherein the method steps are performed by the STB.

In still more embodiments described herein, usage data about the STB such as channel change data can be communicated from a PAN transceiver connected to the STB to a remote server via the proxy service described herein, thereby providing a remote server with useful data for assessing viewership ratings applicable to television programming consumed via the STB.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 3 illustrates a method for generating ratings information using a personal area network according to an exemplary embodiment;

FIG. 4 illustrates another method for generating ratings information using a personal area network according to an exemplary embodiment; and FIG. 5 illustrates a method for configuring a set top box remotely through a personal area network connection between a computing device and the set top box according to an exemplary embodiment.

FIG. 6 illustrates a method for authenticating VOD selections when VOD selections are made through a remote feature on a computing device according to an exemplary embodiment.

FIG. 11 illustrates an example process flow for execution by a processor of a PAN transceiver unit for maintaining and updating a list of devices within range of the PAN, as well as outputting the list over the PAN.

DETAILED DESCRIPTION

Figure 1:
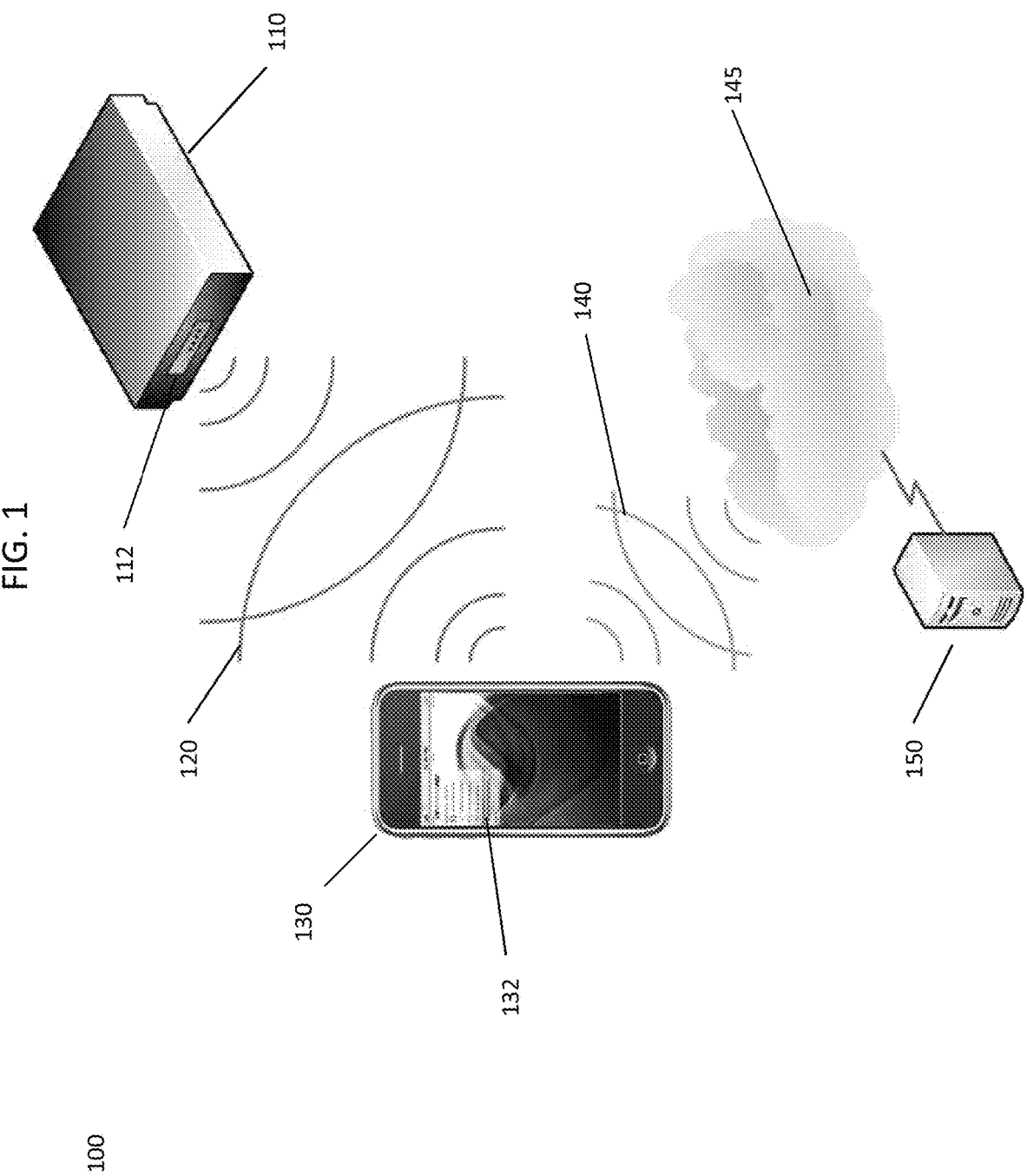
FIG. 1 illustrates a system diagram according to an exemplary embodiment.

Referring to the accompanying drawings in which like reference numbers indicate like elements, FIG. 1 illustrates a system diagram, including the three main devices involved in the PAN proxy system according to an exemplary embodiment. As shown in FIG. 1, the PAN proxy system 100 includes a set top box ("STB") 110, a computing device 130, and a VOD/application server 150. The computing device 130 connects to the STB 110 through a PAN connection 120, such as a Bluetooth or Bluetooth Low Energy (BLE) connection. The computing device 130 also connects to the server 150 through a WAN 140. The server 150 may be found using internet protocols, so the computing device 130 connects to the server 150 through the Internet 145.

The STB 110 may be a standard STB used for cable or satellite television, or the "STB" may be an application specific computing device such as an automobile computer system. For example, the STB 110 may include a processor, a motherboard, memory, a graphics unit for outputting video to a connected television, and a hard drive for storing VOD videos or programs recorded using a digital video recorder ("DVR"). The STB 110 may further include a sensor, such as an infrared sensor, for receiving commands made by a viewer through a remote control device. The sensor may also receive signals through other wireless communication means, such as Wi-Fi, Bluetooth, Zigsbee, or radio frequency. Further still, the STB 110 connects to a display device, such as a television or projector, to display audio/video content to the viewer. Any standard STB 110 may be used in the exemplary embodiments.

The STB 110 further comprises the PAN transceiver 112. The PAN transceiver 112 may alter the configuration of the STB 110 such that any typical, off-the-shelf STB may use the PAN communication protocol 120 and communicate with the computing device 130. In some embodiments, the STB 110 is manufactured to include the PAN transceiver 112, or the PAN transceiver may be added to the STB 110 subsequently to the STB's 110 manufacture. The PAN transceiver 112 may connect to the central processor of the STB 110 through a serial connection means, such as USB, Serial Peripheral Interface (SPI) bus, RS-232 or other flexible peripheral interconnection bus ("FPI"). The PAN transceiver 112 may receive power from the STB 110, and a power cable and the serial connection wires may be contained in the same ribbon cable. In one embodiment, the PAN transceiver 112 includes a Bluetooth transceiver and a processor. The processor can be configured to send and receive instructions to/from the STB 110 and send data transmission instructions to the Bluetooth transceiver. The Bluetooth transceiver can be configured to receive instructions from the processor, and send Bluetooth wireless data transmissions in response to the received instructions from the processor. The PAN transceiver 112 may further include status indicator lights forming a user interface.

While BLE communication has been described and will be primarily described below, any wireless communication protocol may be used for communicating data between the computing device 130 and the STB 110 by the exemplary embodiments. However, the inventors believe that BLE has a number of advantages. First, Bluetooth technology, especially Bluetooth low energy ("BLE") is already found in many computing devices. Also, personal area network protocols, like BLE, are private connections with a 30 foot range. Because carriers consider PANs private networks, forming a PAN does not cost a wireless subscriber any tethering fees. Further still, BLE transceivers can be manufactured for a relatively small amount of money. For example, a BLE transceiver according the exemplary embodiments can be manufactured for approximately $1-3, which may be one-tenth the cost of a GSM chip. Therefore, adding a BLE transceiver does not significantly affect the STB's 110 price to manufacture or purchase.

Preferably, the PAN transceiver 112 is mounted on the outside of the STB 110 metal chassis but behind the plastic front bezel to maximize the range of the PAN 120 as consumers are typically in front of the STB 110. PAN protocols, such as BLE, have relatively small ranges (e.g. 30-40 feet). If the PAN transceiver 112 was mounted within the STB 110, the metal frame of the STB 110 may create a Faraday shield and reduce the range of the PAN transceiver. In an effort to increase range, the PAN transceiver 112 is mounted on the front of the STB 110 metal chassis so that wireless signals are directed toward the user. The BLE transceiver may be mounted on the metal frame of the STB 110, but the PAN transceiver 112 may include a plastic cover that covers the BLE transceiver. The plastic cover may include LED status indicator lights, an LCD screen that displays operator instructions, or any other customized appearance for aesthetic purposes. In an effort to reduce costs for the PAN transceiver 112, the plastic cover may include minimal extra technology and aesthetic features.

The range of the BLE transceiver may be adjusted to avoid false positives, such as in the case where a person is directly above the STB 110, but on a different floor of a home. The BLE transceiver may be adjusted at any time. The BLE transceiver's range may be adjusted by varying the amount of power provided to the BLE transceiver by a power supply within the STB 110. Alternatively, the BLE communications can be focused or directed to a desired area via the use of directional antennas and/or shielding the antenna.

The PAN transceiver 112 includes its own processor to minimize system integration efforts with the STB 110 processor. Also, the processing unit within the PAN transceiver 112 may perform all wireless communication processing, and as such the STB's 110 processor does not have to perform substantially more processing as a result of adding the PAN transceiver 112. The PAN transceiver 112 may include a memory unit that includes software. Using the software, the processing unit can assemble/reassemble Bluetooth messages, create VOD request and/or application messages, and also include billing information.

The computing device 130 may be any computing device that has data access to the WAN 140. For example, the computing device 130 may be a smart cellular phone at least comprising a processor, a memory unit, a PAN transceiver (e.g. BLE) and a WAN transceiver (e.g. GSM/LTE, WiFi). The computing device 130 may also be a tablet computer, a laptop, and iPod (or similar device) or other portable or handheld computing device as long as it is capable of data communication with both a PAN and another network such as a WAN. Preferably, the computing device 130 has a touch screen interface. However, it should be understood that any of a variety of data display techniques and data input techniques could be employed by the computing device 130. For example, to receive inputs from a user, the computing device need not necessarily employ a touchscreen—it could also or alternatively employ a keyboard or other mechanisms such as voice capture-to-text translation. The WAN 140 may be any wireless data communication network, such as GSM (3G, 4G, LTE), Wi-Fi, other any other WAN wireless communication.

Figure 7B:
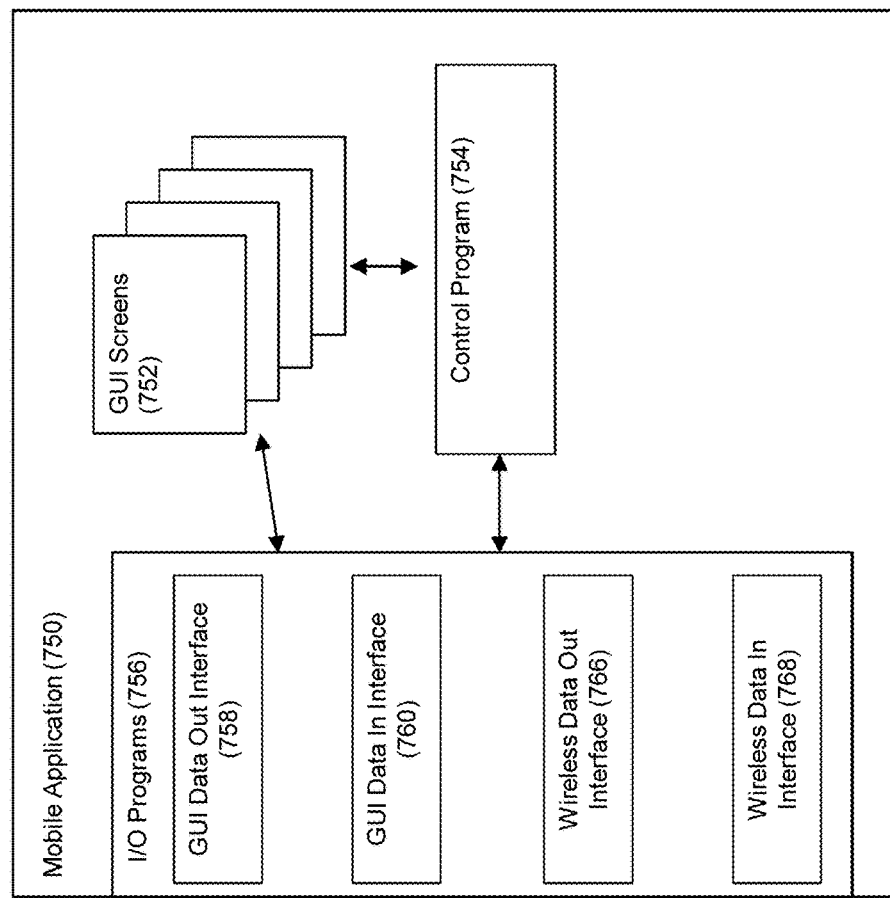
FIGS. 7(a) and 7(b) illustrate components and modules for an exemplary computing device.
Figure 7A:
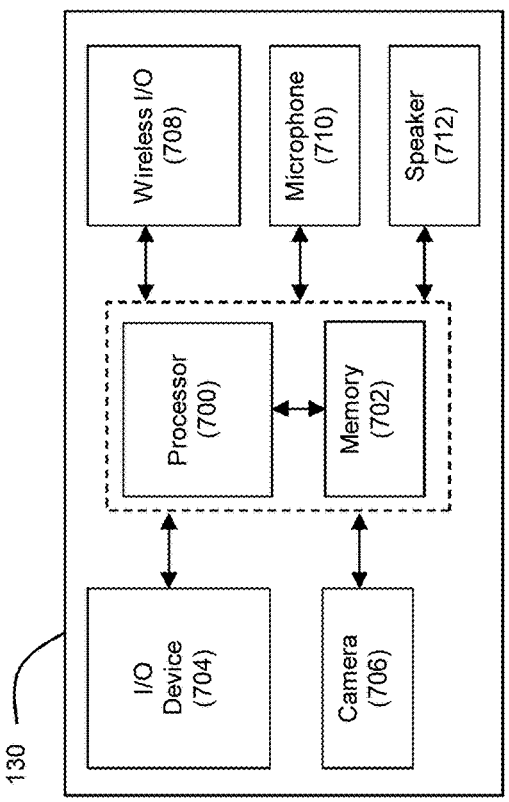

FIG. 7(a) depicts an exemplary embodiment for a computing device 130. The mobile device 130 may comprise a processor 700 and associated memory 702, where the processor 700 and memory 702 are configured to cooperate to execute software and/or firmware that supports operation of the computing device 130. Furthermore, the computing device 130 may include an I/O device 704 (e.g., a touchscreen user interface for graphically displaying output data and receiving input data from a user), optionally a camera 706, wireless I/O 708 for sending and receiving data, a microphone 710 for sensing sound and converting the sensed sound into an electrical signal for processing by the computing device 130, and a speaker 712 for converting sound data into audible sound. The wireless I/O 708 may include capabilities for making and taking telephone calls, communicating with nearby objects via near field communication (NFC), communicating with nearby objects via RF, and/or communicating with nearby objects via the PAN. These components are now resident in many standard models of smart phones and other mobile devices.

The computing device 130 may include an application 132 for execution by a processor of the computing device 130. The application 132 leverages the computing device's 130 communication resources, which include both WAN 140 and PAN 120, to offer proxy services without the cost of tethering services offered by a wireless carrier. The application 132 on the computing device 130 acts as a proxy to the STB 110 so that the STB 110 can send/receive messages, such as VOD authorization requests, to the VOD/application server 150.

The application 132 can send/receive data messages through the WAN 140, and the application 132 can further communicate locally with the STB 110 whenever the computing device 130 is within range of the STB 110 BLE transceiver 112 using the PAN 120.

FIG. 7(b) depicts an exemplary mobile application architecture 750 that can be used for app 132. App 132 with the architecture 750 of FIG. 7(b) can be installed on the computing device 130 for execution by processor 700. The mobile application architecture 750 preferably comprises a plurality of computer-executable instructions resident on a non-transitory computer-readable storage medium such as a computer memory. The instructions may include instructions defining a plurality of GUI screens for presentation to the user through the I/O device 704. The instructions may also include instructions defining various I/O programs 756 such as:
  a GUI data out interface 758 for interfacing with the I/O device 704 to present one or more GUI screens 752 to the user;
  a GUI data in interface 760 for interfacing with the I/O device 704 to receive user input data therefrom;
  a wireless data out interface 766 for interfacing with the wireless I/O 708 to provide the wireless I/O with data for communication over the networks 120 and 140; and
  a wireless data in interface 768 for interfacing with the wireless I/O 708 to receive data communicated over the networks 120 and 140 to the portable computing device for processing by the mobile application 750.

The instructions may further include instructions defining a control program 754. The control program can be configured to provide the primary intelligence for the mobile application 750, including orchestrating the data outgoing to and incoming from the I/O programs 756 (e.g., determining which GUI screens 752 are to be presented to the user).

Whenever a VOD selection is made by the viewer, or an application message needs to be sent, the STB 110 sends a message through the PAN transceiver 112 to the computing device 130 over the PAN wireless connection 120. The PAN transceiver 112 performs segmentation of the STB 110 message. Segmentation divides the message into smaller sized messages for transmission over PAN. Upon receiving the smaller segmented messages, the application 132 reassembles the messages to the original STB message then prepares the message for transmission over the WAN 140 to the server 150. This preparation process may include extracting the message, removing PAN formatting/headers according to the PAN protocol data, and attaching necessary WAN 140 protocol parameters (e.g. TCP/IP headers/formatting) to the message. The message itself may include the content selection, a timestamp, a customer code, a satellite TV account number, and possibly billing formation. The message may or may not have to be translated by the application 132 into a format understood by the server 150. Preferably, the application 132 need not alter the data comprising the message from the STB 110, and simply prepares the data packets for transmission over the WAN 140 and the World Wide Web 145.

The server 150 may comprise one or more computers linked together. The server 150 may function like a web server and may be associated with a satellite company website or other application servers. To perform the tasks of a web server, the server 150 at least includes a network interface, one or more processors, and a computer-readable storage medium. The server 150 collects messages sent from customer computing devices 130, logs the messages, and generates authorization messages. The server 150 may send the authorization message to the STB 110 via a satellite, directly to STB 110 through an established connection, or through the WAN 140 and the PAN 120 using the computing device 130 as a proxy.

After the STB 110 receives an authorization message, the STB 110 begins playback of the selected content. Based on the transmission speed of the WAN 140, the amount of time necessary to send the authorization request and receive the authorization message should be relatively short because the amount of data sent over the WAN 140 should be a very small amount of data (on the scale or bytes or kilobytes). The server 150 may authenticate the VOD selection and request so that VOD selections and purchases can be tracked. The server 150 authenticates VOD selections and purchases according to a license agreement with the content producer, and the server 150 further tracks VOD selections. VOD logs created by the server 150 may be shared with content producers for billing, usage, and/or ratings purposes. When VOD content is not free, the server 150 may also process billing for the purchase, or the server 150 may send the VOD purchase data to another server that handles billing.

Before VOD purchases and requests can be made, the satellite provider may instruct the customer to do an initial device set-up. This device set-up or initialization phase needs to only be performed once per computing device 130. During the initialization phase, the computing device 130 and the STB 110 are paired. The first step of the initialization phase may involve the customer downloading the application 132 to his or her computing device 130, and user may complete the pairing process by using the application 132. The user may download the application 132 from an application store or by activating a hyperlink provided to the customer by the satellite provider through an email or text message.

As stated above, the application 132 may provide a guide or wizard that assists a user in pairing the computing device 130 and the STB 110 over the PAN 120. Once the PAN pairing process completes, the user enters their username and password to the service provider's online web account to permit the application 132 to login and attain secure user and account information providing a validation of the user and the computing device 130. The application 132 maintains a secure connection to the server 150 to transport usage, billing, and other application information. In the example of BLE, a user manually pairs the computing device 130 and the STB 110. After the initial pairing, the BLE module in the computing device 130 and the BLE module in the PAN transceiver 112 automatically reconnect whenever the computing device 130 enters the range of the STB 110. By using BLE, a viewer may not be aware that the computing device 130 is connected to the STB 110 over the PAN 120. The application 132 may perform pairing and reconnection in the background of the computing device 130 so that a user is not interrupted even while the user interacts with the computing device 130.

After pairing with the STB 110 during the initialization process, the application 132 may prompt the customer for information about the STB 110 and information about the customer. The application 132 may request account information from the customer, such as a username and password associated with their satellite TV subscription (such as the user name and password used to log into a satellite provider's billing website or the like). In the situation where the customer does not have a username and password set up with the satellite provider, the application 132 may register the customer as a new user by receiving account information (like an account number, billing address, social security number, etc.) and requesting that the customer choose a username and password. The application 132 may store the username and password on a computer-readable medium in the computing device 130 so that the customer does not need to enter the username and password every time they wish to view VOD content.

The application 132 may be able to download information associated with the customer using the user name and password from the server 150. For example, the server 150 may associate a plurality of data with the customer username, such as an account number, a billing address, a customer name, a subscription package, STB 110 serial numbers, STB 110 makes/models, or any other information the satellite company may store when activating the satellite service for the customer. In some situations, the server 150 may not have access to all of this information, and the customer may have to enter requested information through the application 132 when prompted. This data entry process is performed only once per computing device 130 to minimize customer inconvenience, and the computing device 130 or the server 150 stores the data entered by the customer on a computer-readable medium.

For security purposes, the application 132 may be the only way to pair a computing device 130 with the STB 110. The PAN 120 connection may also be encrypted for security purposes. Secure connections prevent an unauthorized user from making VOD purchases using the customer's STB 110 and billing information.

That said, the STB 110 may pair with multiple computing devices 130. For example, a family of five may share a satellite subscription. If each family member has a respective computing device 130, the STB 110 may pair with all five computing devices 130 so that each family member can watch VOD selections.

The application 132 may be configured to prevent some computing devices 130 from making VOD purchases that are age restricted. For example, if the youngest child in the family is a minor, the application 132 may prevent the youngest child from purchasing R-rated movies or watching TV-MA VOD programs. The application 132 may prevent a user from viewing age restricted material by simply not passing messages to the server 150 and displaying on the computing device 130 that the user is not authorized to make age restricted selections. The STB 110 may also display the age restricted warning on the television by receiving a message from the computing device 130 over the PAN 120 connection saying that the user may not view R-rated movies or TV-MA rated television programs.

Still during the initialization process, the application 132 may request demographic information about the user of the computing device, such as name, gender, age, ethnicity, location, favorite television shows or channels, etc. This information may be used for a television ratings embodiment, which is described in more detail below.

If more than one computing device 130 is within range, the STB 110 can use any of the computing devices 130 to request authorization for selected VOD content. The STB 110 may rank computing devices 130 in a preference (for example, "If 'Mom's' computing device 130 is within range, always use her computing device 130 for authorization"), or the STB 110 may simply use the computing device 130 that re-paired with the STB 110 most recently or least recently.

It should be noted that, even though the exemplary embodiments have been described to include an STB 110 and a PAN transceiver 112, some televisions, such as Smart TVs, may include a Bluetooth connection. If the TV is a Smart TV, and no cable box is required, the STB 110 and PAN transceiver 112 can be replaced by an application that is installed on the Smart TV.

The viewer may make VOD selections through an on-screen menu generated and displayed by the STB 110 on a television screen. VOD selections may also be made through the application 132. One of the application 132 features may be a remote control feature, where the user may view VOD content, view a channel guide on their computing device 130, and control the STB 110 using the computing device 130. To provide such a remote feature on the computing device 130, the PAN transceiver 112 may further include software that receives the selection messages or remote control-type messages from the computing device 130, translates the messages into a format understood by the STB 110, and sends the messages to the STB 110 main processor so that the processor tunes to the correct channel or begins playback of the VOD selection.

If a user makes a VOD selection on the computing device 130, the application 132 may directly send the VOD content authorization request to the server 150. A method 600 for making VOD selections through the application 132 is shown in FIG. 6. The method 600 begins in step 602 when the application 132 receives a VOD selection from a user through a user interface generated by the application 132. Next, the computing device 130 sends the VOD selection directly to the server 150 for authentication of the VOD selection in step 604. The computing device 130 sends a VOD selection message over the WAN 140. After the server 150 receives the VOD request message, the server 150 authenticates the VOD request in step 606. The server 150 may then send an authenticated message to the computing device 130 over the WAN 140 in step 608. After the computing device 130 receives the authentication message, the computing device 130 sends the VOD selection and the authentication message to the STB 110 over the PAN 120 in step 610. After the STB 110 receives the VOD selection and the authentication message, the STB plays the VOD selection in step 612.

The authentication message to the STB 110 may only be sent by the application 132 to the STB 110 after the application 1320 has received an authentication message from the server 150. Alternatively, the STB 110 may receive VOD content from the server 150 after the VOD selection made through the application 132 has been authenticated.

Figure 2:
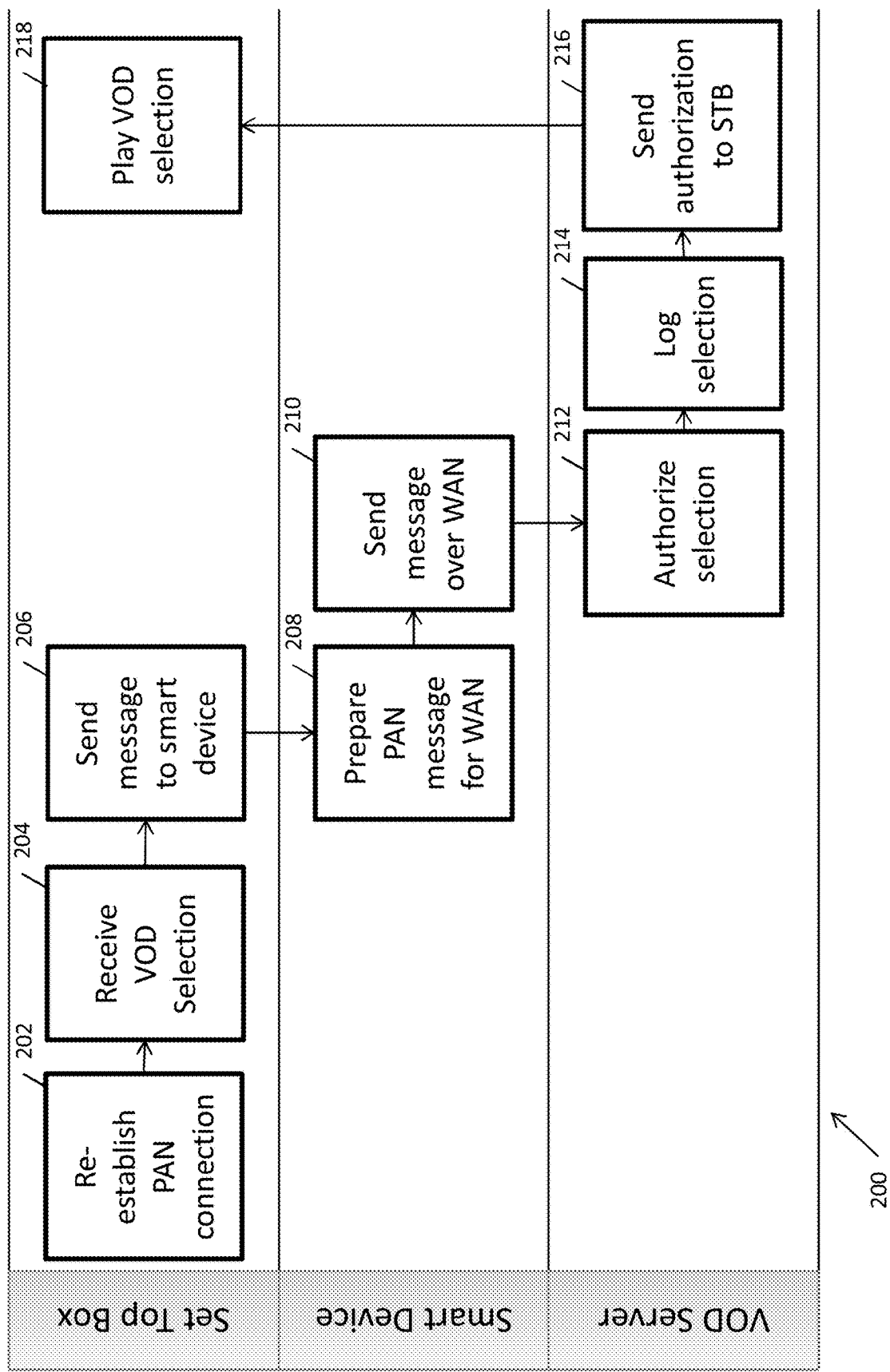
FIG. 2 illustrates a method for using a personal area network to authorize video on demand purchases according to an exemplary embodiment.

Referring now to FIG. 2, a method 200 for authorizing VOD content using the system of FIG. 1 is illustrated. The method 200 uses three separate devices: the STB 110, the computing device 130, and the server 150. FIG. 2 illustrates which device performs each step of the method 200.

The method 200 begins in step 202 when the computing device 130 and the STB 110 establish a PAN 120 connection. If this is the first time the computing device 130 and the STB 110 have connected, the viewer may need to perform the steps comprising the initialization process. Normally, re-establishing the PAN connection is automatically performed by the PAN transceiver 112 and the computing device 130 whenever the computing device 130 enters the range of the PAN transceiver 112.

Subsequently, the method 200 continues in step 204 when the STB 110 receives a VOD selection from the viewer. The STB 110 may receive this selection from a standard infrared remote or through the remote feature of the application 132 described above. For the following example, it will be assumed that the STB 110 received the VOD selection from an infrared remote control signal.

After the viewer makes a VOD selection, the STB 110 sends a message to the computing device 130 requesting that the computing device 130 relay the message to the server 150 over its WAN 140 connection. This message requests authorization to play the VOD selection on the STB 110. The message may include information about the selected content, information about the viewer, information about the STB 110, a timestamp, or any other information used by the server 150 to authorize a VOD purchase or selection. The message is sent by the STB 110 using the PAN transceiver 112 over the PAN 120 connection (e.g. Bluetooth) with the computing device 130.

The computing device 130 receives the PAN message from the STB 110, and using software instructions defined by the application 132, a processor within the computing device 130 alters the PAN message into a message that can be sent over the WAN 140 in step 208. This alteration may involve reassembling the message based on the BLE protocol and assembling data packets according to TCP/IP protocol. In general, TCP/IP protocol involves generating data packets that comprise the message from the STB 110, adding an internet address, and any other necessary steps required to send a message over the WAN 140.

In step 210, the computing device 130 sends the message over the WAN 140 according to the WAN 140 transmission protocols (e.g. TCP/IP). The application 132 stores an Internet address for the server 150 so that messages can be sent to the server 150 over the WAN 140. A TCP/IP protocol stack for the computing device 130 may handle some or all of the data transmission procedures.

In step 212, the server 150 receives the message from the computing device 130 and authorizes the purchase or selection in step 212. This authorization process may involve determining whether the viewer has paid for the content he wishes to watch (e.g. a person who does not have an HBO subscription cannot watch an HBO program on demand without an HBO subscription). This process may further involve requesting a license from the content producer. If the program is a rental or a pay-per-view type purchase, the authorization process may involve billing the viewer's account. If the person has paid for the subscription and requested an eligible program, the server 150 authorizes the selection. After authorizing the server 150 logs the selection in step 214. Logging may be used to track user viewing habits or for billing purposes.

After the request is authorized, the server 150 sends a message to the STB 110 through any capable data communication means in step 216. For example, the server 150 can send an authorized message directly to the STB 110, through the computing device 130 over the WAN 140 and the PAN 120, or through the satellite that provides the satellite feed.

Finally, the STB 110 receives the authorization message from the server 150 and begins playback of the VOD content selection made by the viewer in step 218.

As can be seen by the system and method described in FIGS. 1 and 2, VOD selections and purchases can be made even with a satellite subscription and without a broadband internet connection. The solution illustrated in FIGS. 1 and 2 requires no additional wireless subscriptions, minimal user effort, and minimal additional equipment costs.

Referring now to FIGS. 3 and 4, a method 300 and a method 400 for gathering demographic information and generating ratings information for VOD or live television programs is illustrated. As described above, the initialization process not only pairs a computing device 130 to the STB 110, but the initialization process may also gather demographic information about a customer. In general, the computing device 130 is associated with only one user of the computing device 130. In a family of five, it is entirely reasonable to assume that each member of the family has their own computing device 130. Generally people carry computing devices 130 with them just about everywhere, so whenever someone enters the room to watch TV, it is safe to assume that the computing device 130 also enters the room. Based on this assumption, the STB 110 and the computing devices 130 in range of the STB 110 can send information about what television programs are being watched by each member of the family.

Information for generating ratings can be performed in either a VOD example or a live streaming television example. Starting with the VOD example, the method 300 begins in step 302 where the STB 110 re-establishes a connection with a paired computing device 130. If this is the first time the computing device 130 and the STB 110 have connected, the viewer may need to perform the steps comprising the initialization process. Normally, re-establishing the PAN 120 connection is automatically performed whenever the computing device enters the range of the PAN transceiver 112.

Subsequently, the method 300 continues in step 304 when the STB 110 receives a VOD selection from the viewer. The STB 110 may receive this selection from a standard infrared remote or through the remote feature of the application 132. As described above, this selection may be received by the application 132 through the remote feature of the application 132 and not the STB 110. For the following method, it will be assumed that the STB 110 received the VOD selection. If the selection is made through the application 132, step 304 is performed by the computing device 130, and steps 306 and 308 may be omitted.

After the viewer makes a VOD selection, the STB 110 sends a message to the computing device 130 requesting the computing device to send the message to the server 150 over its WAN 140 connection in step 306. This message requests authorization to play the VOD selection on the STB 110. The message is sent by the STB 110 using the PAN transceiver 112 over the PAN 120 connection. For example, the PAN 120 connection is BLE.

The computing device 130 receives the PAN signal from the STB 110, and using the software instructions defined by the application 130, a processor within the computing device 130 changes the PAN message into a message that can be sent over the WAN 140 in step 308. This may involve TCP/IP protocol, generating data packets that comprise the message from the STB 110, and any other necessary steps required to send a message over the WAN 140.

Further, in the method 300, the application 132 attaches demographic information about the user of the computing device 130 in step 310. This information may be general or very specific. For example, the demographic information may only include an age range (e.g. 18-25), a gender, and a location, or the information may include the actual name of the customer, the customer's actual age, the customer's gender, or any other user-specific information. This information is included in the VOD request for authorization so that VOD server can track the demographics for all the people who selected this particular VOD content selection. The application 132 stores the demographic information about the user, and the application 132 retrieves the demographic information from some computer-readable medium before sending the VOD authorization request.

In step 312, the computing device 130 sends the message over the WAN 140 according to the WAN transmission protocols (e.g. TCP/IP). The application 132 stores an Internet address for the server 150 so that messages can be sent to the server 150 over the WAN 140 and the World Wide Web 145.

In step 314, the server 150 receives the message from the computing device 130 and logs the demographic information in step 314. The stored demographic information is associated with the content selection made by the user. The stored demographic information that is associated with a particular content selection allows the server 150 to calculate the ratings for the content selection over a given amount of time. For example, hypothetical television show "Breaking Sad" may be watched by 1000 VOD viewers over the first week of September. This rating information may be very valuable to advertisers considering advertising during subsequent episodes of "Breaking Sad" and also to producers of the show.

After logging demographic information or concurrently with the logging process, the server 150 authorizes the purchase or selection in step 316. This authorization process may involve determining whether the viewer has paid for the content he wishes to watch. This process may further involve requesting a license form the content producer. If the person has paid for the subscription and requested an eligible program, the server 150 authorizes the selection.

After the request is authorized, the server 150 sends a message to the STB 110 through any means in step 318. For example, the server 150 can send an authorized message directly to the STB 110, over the WAN 140 and the PAN 120 using the computing device 130 as a proxy, or through the satellite that provides the satellite feed.

Finally, the STB 110 receives the authorized message from the server 150 and begins playback of the content selection made by the viewer in step 320.

Referring now to FIG. 4, a method 400 for collecting demographic information during live television is illustrated. The method 400 begins at step 402 where the STB 110 re-establishes a connection with a paired computing device 130. If this is the first time the computing device 130 and the STB 110 have connected, the viewer may need to perform the steps comprising the initialization process. Normally, re-establishing the PAN 120 connection is automatically performed whenever the computing device enters the range of the PAN transceiver 112.

While the viewer interacts with the STB 110 while watching live television, the STB 110 may periodically send a message to the computing device 130 that 1) instructs the computing device to send a message to the server 150 with demographic information, and 2) includes television content that the user is viewing in step 404.

Because viewing patterns can be random, and viewers often switch channels, the periodic nature of the message sending may not be constant. For example, the STB 110 could send a message to the computing device 130 at the end of every period (e.g. every 10 minutes). However, this strictly periodic method may not be the best method for tracking viewing patterns. Viewers often flip channels and programs, so it is possible that a message gets sent to the server 150 indicating a channel that the viewer was not actually watching, but merely a channel or show the viewer was tuned to at the end of a reporting period while flipping channels.

Alternatively, the STB 110 may monitor channel changes. FIGS. 8-11 discussed below describe example embodiments of how channel change data output by STB 110 can be leveraged by the PAN and proxy service to provide useful data to a remote server that can be used to develop ratings information. For example, the STB 110 may send a message to the computing device 130 requesting that the computing device 130 send a message to the server 150 indicating which channel the viewer is watching after the viewer remains watching one channel or show for a designated period. For example, if a user remains watching one channel for five or ten minutes without flipping channels, the STB 110 may request that the computing device 130 send a viewing habits message. Using this method, the STB 110 can be relatively confident that the viewer is actually watching the channel or show, and not merely searching for a program to watch.

The STB 110 may also monitor changes in programming by referencing a programming guide. Often viewers will navigate to a channel before a program begins with no real interest in the show playing before the desired program begins (e.g. tune to channel 6 at 8:56 anticipating the 9 PM show). So, if a user navigates to a channel, but the program is about the change in the next few minutes, the STB 110 may wait until the next program begins before starting a clock that determines when to send a viewing habits message. The STB 110 may monitor programming schedules using a content guide. If the viewer remains on the same channel for five or ten minutes after a new show begins, the STB 110 can safely assume the viewer is watching this program, and the STB 110 sends a message to the computing device 130 so that the computing device can relay the information to the server 150.

The viewing habits message sent by the STB 110 may include the program and channel watched by the viewer. The STB 110 may request that all computing devices 130 within range of the STB 110 send the ratings message. The STB 110 may need to track how long each computing device 130 within range has been within range. For example, a first computing device 130 may be within range of the STB 110 for twenty minutes, but a second device may only have been within range of the STB 110 for one minute. So, the first computing device 130 may be ready to send a viewing habits message, but the second computing device 130 has not been within range of the STB 110 for long enough.

Whenever the computing device 130 receives a message from the STB 110 indicating the show being watched, the computing device 130 uses the software instructions defined by the application 132, and a processor within the computing device 130 changes the PAN message into a message that can be sent over the WAN 140 in step 406. This may involve reassembling the message based on the PAN protocol, generating data packets that comprise the message based on TCP/IP protocol, and any other necessary steps required to send a message over the WAN 140.

Further, in the method 400, the application 132 attaches demographic information about the user of the computing device 130 in step 408. In step 410, the computing device 130 sends the message over the WAN 140 according to the WAN transmission protocols (e.g. TCP/IP). The application 132 stores an internet address for the server 150 so that messages can be sent to the server 150 over the WAN 140.

In step 412, the server 150 receives the message from the computing device 130 and logs the demographic information and the content/channel data in step 314. The stored demographic information is associated with the content being watched by the user. The stored demographic information that is associated with a particular content allows the server 150 to calculate the ratings for the content. For example, the server 150 can determine how many subscribers watched a program when the program aired.

Through the ratings calculation methods of FIGS. 3 and 4, a cable or satellite provider could generate meaningful ratings information that is more specific than traditional Nielsen ratings. The ratings are more specific in terms of when the person began watching, who was watching, and what shows they watched. In addition, this ratings information is more valuable because a cable or satellite provider likely has more subscribers than the number of viewers participating in a typical Nielsen survey, so the ratings information is more accurate and a better representation of a population's viewing habits than a small Nielsen survey. Information of this type may be very valuable to content producers and advertisers.

Figure 8:
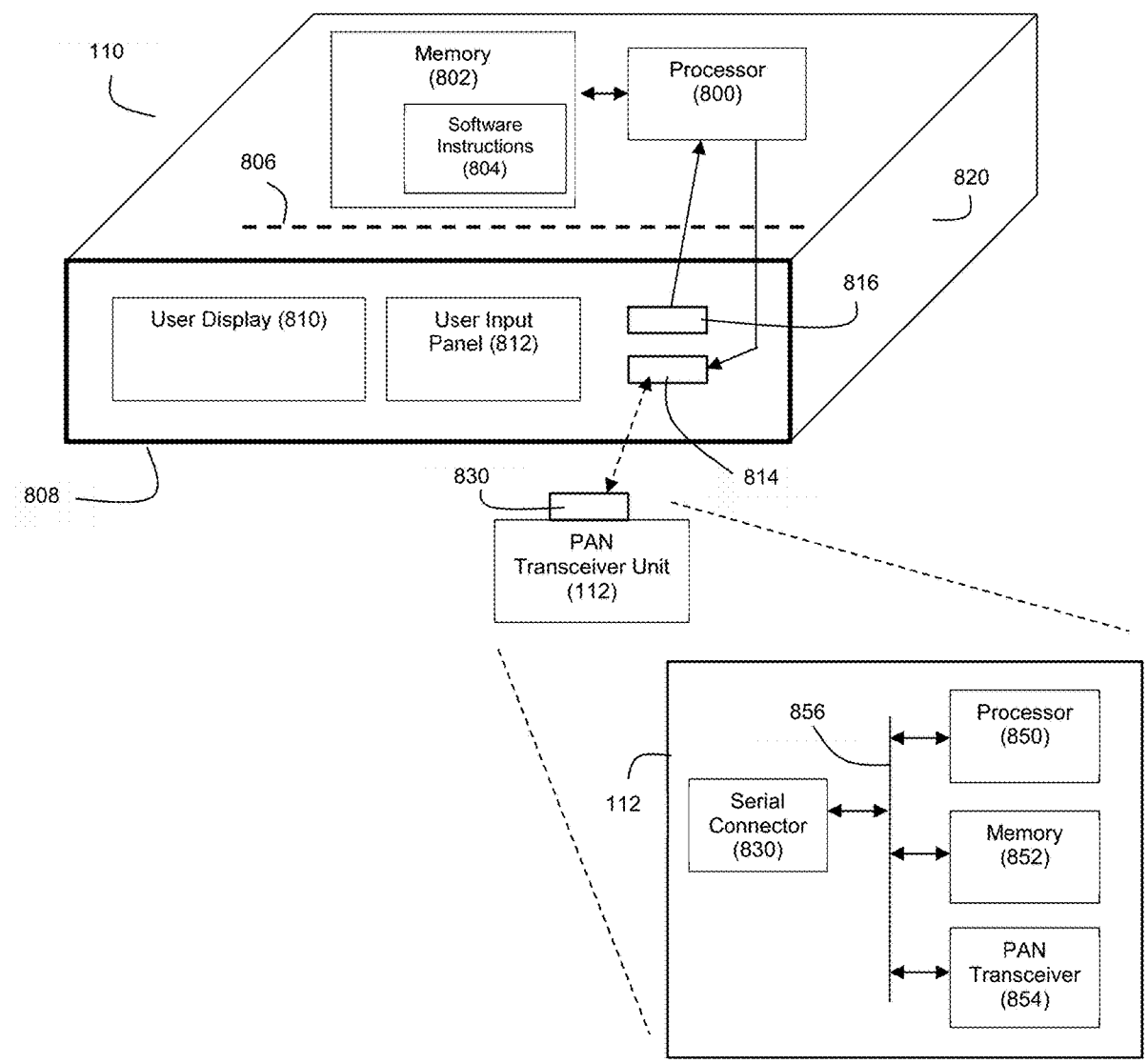
FIG. 8 illustrates an example STB and PAN transceiver unit for use with an example embodiment.

FIG. 8 depicts an example embodiment of an STB 110 and PAN transceiver unit 112 that can be used in connection with ratings data capture as discussed above. The STB 110 can connect with a distinct PAN transceiver unit 112 via serial connection as discussed above. The STB 110 can include a processor 800 and associated memory 804, where the memory can store, among other data, software instructions 804 for execution by processor 800. The processor 800 and memory 802 are resident within an enclosure 820 that typically takes the form of a metal chassis for the STB 110. The processor 800 and memory 802 reside in the STB behind a firewall 806 to protect the operations of STB from unauthorized access. The STB may also include a user display 810 (which is configured to display information such as the current channel being watched, the current time, and/or other status information about the STB), a user input panel 812 (through which the user can provide input such as channel changes, volume changes, power on/off, etc.), a port 814 (which may take the form of a serial connector), and a sensor 816 (through which the STB can receive input from a remote control, for example via infrared (IR)). The STB may also include a front panel 808 which may take the form of a plastic front bezel as discussed above. The user display 810 and user input panel 812 may be part of this panel 808. As noted above, the STB 110 can also include numerous other components such as a motherboard, a graphics unit, and a hard drive which are omitted from FIG. 8 for ease of illustration.

PAN transceiver unit 112 can connect with the STB 110 via port 814. For example, the port 814 may take the form of a serial connector such as a USB connector, a Serial Peripheral Interface (SPI) bus, an RS-232 or other flexible peripheral interconnection bus ("FPI") connector. As shown by FIG. 8 and as discussed above, the PAN transceiver unit 112 may include its own serial connector 830, a processor 850, a memory 852, and a PAN transceiver 854. These components can be interconnected via a bus 856. To connect PAN transceiver unit 112 with STB 110, the serial connector 830 can be connected with port 814 via any suitable connection technique that supports data transfers from the STB 110 to the PAN transceiver unit 112 (e.g., ribbon cable, complementary USB connectors, etc.). Furthermore, as discussed above, to reduce potential interference, the PAN transceiver unit 112 can be mounted such that PAN transceiver 854 is not positioned inside enclosure 820 and instead faces outward from front panel 808. For example, the PAN transceiver unit 112 can be mounted behind the front panel 808 but with the PAN transceiver 854 (or the entire PAN transceiver unit 112) positioned outside the enclosure 820.

It should be understood that the system shown by FIG. 8 is well-suited for operation with legacy STBs where only minimal changes would need to be made to the legacy STBs in order to provide the ratings data capture functionality described herein. Namely, the STB 110 can be updated to add software instructions 804 that will cause the STB to output usage data such as channel changes via port 814 where it can be received by the connected PAN transceiver unit 812 for ultimate transmission to a remote server via the mobile app-based proxy service.

Figures 9, 10:
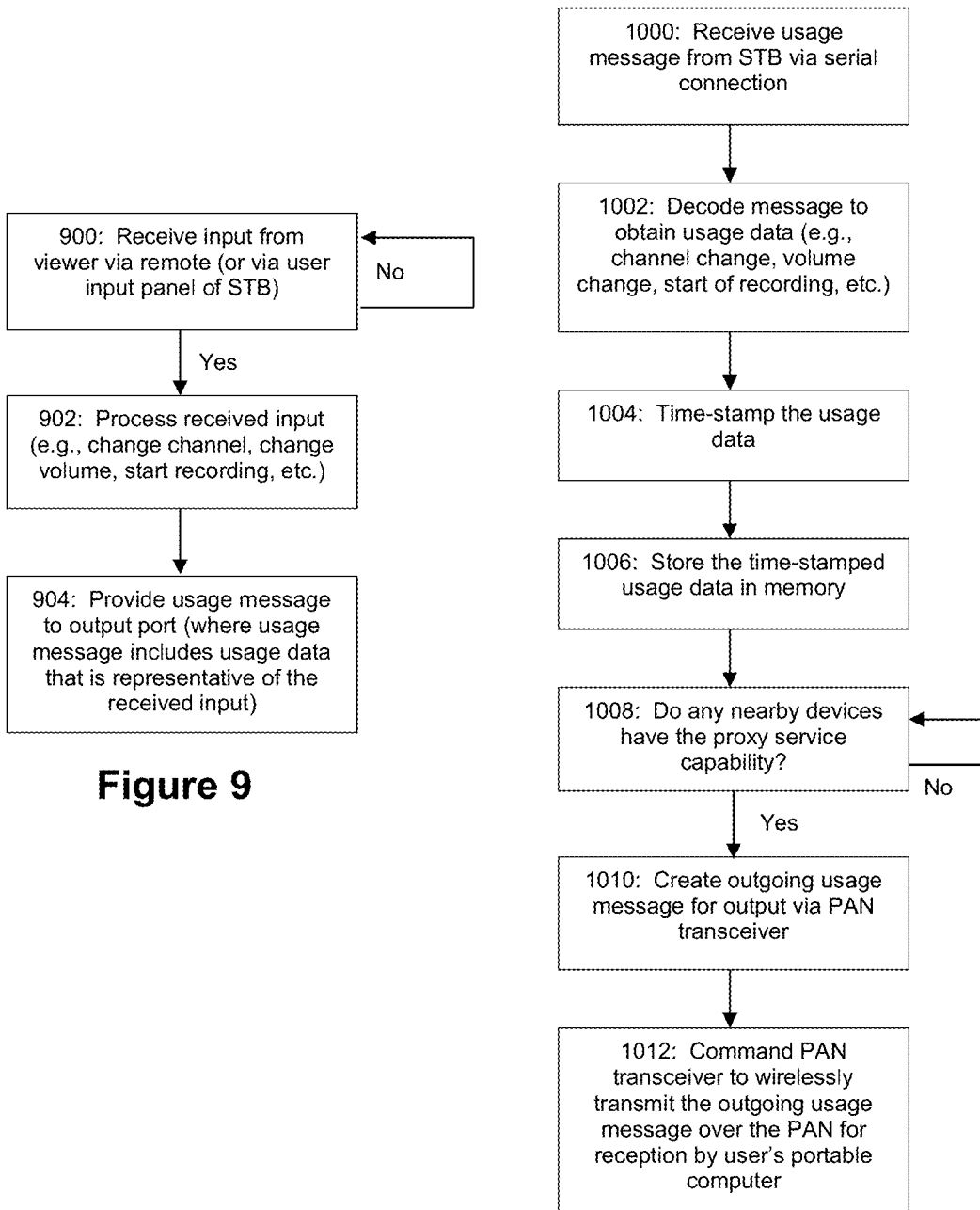
FIG. 9 illustrates an example process flow for execution by a processor of an STB to push STB usage data to a PAN transceiver unit.
FIG. 10 illustrates an example process flow for execution by a processor of a of a PAN transceiver unit for receiving usage data from an STB and outputting such usage data over the PAN.

FIG. 9 illustrates an example process flow that can be performed by processor 800 via execution of software instructions 804. At step 900, the processor 800 receives input from a viewer via a remote control (or via the user input panel 812 of the STB 110). This input can take forms such as channel changes, volume changes, start recording requests, end recording requests, etc. Upon receipt of this input, the process flow continues to step 902 where the processor processes the received input. For example, this may take the form of the processor executing the requested input (e.g., changing the channel as requested, changing the volume as requested, starting/ending a recording as requested, etc.). Next, at step 904, the processor 850 provides a usage message to output port 814. This usage message will include data representative of the input received at step 900 (e.g., channel changes, volume changes, start recording requests, end recording requests, etc.). This usage message can be encoded according to a format that is understood by PAN transceiver unit 814, mobile application 132, and/or remote server. For example, in an embodiment where there is a multi-bit serial connection between the STB and the PAN transceiver unit, the usage message can exhibit a format where the first X bits of the message encode a usage data type (e.g., where a channel change would have a first code within these X bits while a volume change would have a second code within these X bits, etc.) and where the next Y bits of the message encode the usage data itself (e.g., these Y bits represent the channel to which the STB has been changed or the number of channel up/down increments). In this fashion, through only minimal changes to the STB, the PAN transceiver unit 112 can be leveraged to capture useful information for assessing ratings data regarding television viewing habits. Given that the usage data output via port 814 in an example embodiment is effectively the same data that is already communicated to users via the STB's user display 810, the inventor expects that STB providers will be amenable to making the relatively nonintrusive software change behind firewall 806 (the addition of software instructions 804) without fear of rendering the STB susceptible to unauthorized tampering.

FIG. 10 illustrates an example process flow that can be performed by processor 850 of the PAN transceiver unit 112 to receive and process the usage messages output by the STB. Software instructions resident in memory 852 can be accessed and executed by processor 850 to carry out this process flow.

At step 1000, the processor 850 receives a usage message from the STB via the serial connection 814/830. At step 1002, the processor decodes the usage message to obtain the usage data contained therein. As explained above, the usage message can exhibit a format that is understood by processor 850. The usage data can identify channel changes by the viewer, volume changes, start/end of recordings, etc. However, it should be understood that in other embodiments, the PAN transceiver unit 112 need not decode the usage message. For example, the PAN transceiver unit may operate to simply relay the usage message in the format received to the mobile application 132 after encapsulating that usage message with appropriate formatting for transmission over the PAN (and adding a time-stamp as per step 1004 below).

At step 1004, the processor 850 time-stamps this usage data. The PAN transceiver unit 112 can maintain a calendar and clock that tracks the current date and time. The usage data can be associated with the current date/time at step 1004 to enable a remote server to assess what was being watched when by a viewer for the purpose of developing ratings information. At step 1006, this time-stamped usage data is stored in memory (e.g., the processor 850 can store the time-stamped usage data in memory 852 as a data structure where the usage data type, usage data, and time-stamp are all associated with each other). However, it should be understood that time-stamping by the PAN transceiver unit 112 may be unnecessary if the STB already time-stamps the usage data when outputting the usage data via the STB output port 814.

It should be understood that the PAN transceiver unit 112 can perform steps 1000-1006 regardless of whether there are any nearby smart devices that execute the mobile application 132 to create the proxy service. Thus, even if the relevant smart device that executes the mobile application 132 to create the proxy service is not in the area, the PAN transceiver unit 112 is still capable of accumulating usage data in its memory 852 that indicates the channels being watched through the STB (and when the STB is on those channels).

Next, at step 1008, the processor 850 determines whether any smart devices are within range of the PAN that are capable of sending the usage data to the remote server via the proxy service. This determination can be made by having devices that execute the application 132 maintain a registration that identifies the STB 110 and/or PAN transceiver unit 112 with which it pairs. For example, at an initial setup, the mobile application 132 executing on the smart device of Customer X can be paired with the STB 110 and PAN transceiver unit 112 that are associated with Customer X, and the mobile application 132 will store a unique identifier representative of Customer X's STB and/or PAN transceiver unit 112. In turn, when a smart device (executing the mobile application 132) connects with the subject PAN, the smart device/mobile application can advertise this unique identifier over the PAN. In turn, the PAN transceiver unit 112 for Customer X can be programmed to recognize this unique identifier. When this unique identifier is identified from a nearby smart device, the PAN transceiver unit 112 is able to make a determination that the nearby smart device includes the mobile application with the proxy service capabilities and that the usage data in its memory can now be communicated to a remote server via the proxy service. If no such devices are detected at step 1008, the process flow waits at step 1108 until such a device comes within range of the PAN (meanwhile usage data will continue accumulating in memory 852 through repeated executions of steps 1000-1006). Once such a device is detected at step 1008, the process flow proceeds to step 1010.

At step 1010, the processor 850 creates an outgoing usage message for output via PAN transceiver 854 to a remote server according to a PAN protocol. This outgoing usage message contains data representative of the time-stamped usage data recorded in memory 852 and can be encoded in a format that is understood by the mobile application 132 and/or remote server that will serve as the destination for the message.

In an example embodiment, the processor 850 performs steps 1008 and 1010 on-demand each time a new usage message is received by the PAN transceiver unit 112 from the STB 110. In this fashion, the system is able to capture the most complete picture of a viewer's viewing habits in near real-time. In another example embodiment, the processor 850 performs steps 1008 and 1010 on a periodic basis where the outgoing usage message may aggregate a number of different instances of time-stamped usage data that had accumulated in memory since the prior execution of step 1010. In such an embodiment, it should be understood that the processor 850 may repeat steps 1000-1006 a number of times before performing step 1010. Furthermore, as indicated above, in another example embodiment, the processor 850 may wait to perform step 1010 until after a defined amount of time has passed since receiving the most recent channel change message. In this fashion, the PAN transceiver unit 112 can avoid sending usage messages that merely indicate channel flipping by the viewer as opposed to the viewer actually settling in to watch a program.

At step 1012, the processor 850 commands the PAN transceiver 854 to wirelessly communicate the outgoing usage message over the PAN according to a PAN protocol for reception by the user's portable computer that executes a mobile application to create the proxy service. As discussed above, this mobile app-based proxy service can then relay the usage data from this message to a remote server over a WAN according to a WAN protocol. Optionally, the mobile app-based proxy service may append information about the user of the portable computer to this usage data as noted above. Then, based on the communicated usage data, the remote server can update a ratings database that aggregates usage data for a number of different viewers.

As indicated above in connection with step 1008 of FIG. 10, the PAN transceiver unit 112 can also be used to monitor and track the devices that are within range of the PAN. This capability can also be leveraged by the system to capture useful additional information for ratings purposes. FIG. 11 illustrates an example process flow that can be performed by processor 850 of the PAN transceiver unit 112 to monitor and track such devices. At step 1100, the processor 850 detects each device that is within range of the PAN. For example, in an embodiment where there is a BLE PAN, the different BLE-enabled devices that are within range of the PAN will be observable by the PAN transceiver unit 112 according to the BLE protocol. These devices will be identifiable by a unique device ID. As part of this detection, the processor can maintain and update a list 1120 of "nearby" devices that identifies all of the devices that are detected at step 1100. As used herein, "nearby" in this context refers to a device that is sufficiently close to the PAN transceiver unit 112 such that the device is within range of the PAN and thus detectable by the PAN transceiver unit 112. The nearby device list 1120 can also associate each detected device ID (see field 1122) with a date/time indicative of when that device was first detected during a session (see field 1124) and a date/time where detection of that device was lost (thus ending the session) (see field 1126). This list 1120 can also identify whether a detected device is registered with the PAN transceiver unit 112 and/or STB 110 as discussed above in connection with step 1008 of FIG. 10. The registration status for each detected device can be maintained in field 1128 of list 1120. Further still, it should be noted that the device ID information in list 1120 may also identify a device type (e.g., iPhone, iPad, FitBit, etc.) that would allow a remote server to draw inferences regarding whether a person should be presumed present (and how many persons might be presumed to be present). Thus, if a viewer is watching television with his or her PAN-enabled smart phone and PAN-enabled tablet computer nearby, these two devices can be detected by the PAN transceiver unit 112 at step 1100. Similarly, if two people are in a room watching television, each with their own PAN-enabled smart phones nearby, these two devices can be detected by the PAN transceiver unit 112 (even if one or both of these devices lacks the mobile app that is used to create the proxy service described herein).

In an example embodiment, step 1100 is performed on a repeating periodic basis (e.g., every X minutes or every Y seconds so as to perform step 1100 on an effectively constant basis) so that the PAN transceiver unit can closely monitor nearby devices At step 1102, the processor 850 determines whether there has been a change in the population of nearby devices since the last check. To do so, the processor 850 can compare the current list 1120 with the devices detected at step 1100. If there are differences between the two, the process flow proceeds to step 1104. If there are no differences between the two (i.e., no change in the population of nearby devices), then the process flow can proceed to step 1108.

At step 1104, for any devices that are no longer nearby (i.e., devices that are on list 1120 but not detected at step 1100), the processor 850 can time-stamp the detected absence of such devices and update the list 1120 to note the time-stamped absence in field 1126. For example, as shown in FIG. 11, the device having Device ID "Xyz123" shows a date/time in the "detection end" field 1126 indicating that this device was found to be absent at steps 1100/1102.

At step 1106, for any devices that are newly detected at step 1100 (i.e., devices detected at step 1100 that are not shown on list 1120 as already nearby in an open session), the processor 850 can add time-stamp the detected presence of such devices and update list 1120 to add the device ID for such devices to field 1122 and add the time-stamp for such devices to field 1124.

At step 1108, the PAN transceiver unit 112 measures the signal strength for each detected device on the PAN. This signal strength can be measured via native signal strength measurement capabilities of the PAN transceiver 854. The processor 850 can then update the nearby device list 1120 to track the signal strength for each detected device (see field 1130 shown in FIG. 11 for list 1120). In an example embodiment, step 1108 can be performed by the PAN transceiver unit 112 on a repeating periodic basis, and the resultant signal strength measurements may be time-stamped and accumulated in list 1120 such that each device is associated with a time series of signal strength measurements. As explained below, such signal strength measurements can be used to make highly detailed estimations regarding how close a person might be to the STB when the STB is on a given channel (allowing inferences to be drawn about how closely such person might be paying attention to the content played through a television by the STB).

It should be understood that the PAN transceiver unit 112 can perform steps 1100-1108 regardless of whether there are any nearby smart devices that execute the mobile application 132 to create the proxy service. Thus, even if the relevant smart device that executes the mobile application 132 to create the proxy service is not in the area, the PAN transceiver unit 112 is still capable of maintaining list 1120 in its memory 852 to track the devices that come within range of the PAN.

Next, at step 1110, the processor 850 determines whether any of the devices that are detected as currently nearby include the mobile application with the proxy service capability described herein (as discussed above in connection with step 1008 of FIG. 10). This determination at step 1110 can be made by referencing fields 1126 and 1128 of list 1120 to find registered devices with open sessions. If no such devices are detected at step 1110, the process flow returns to step 1100 to re-execute the process flow (and update nearby device list 1120 accordingly) until such a device comes within range of the PAN. Once such a device is detected at step 1110, the process flow proceeds to step 1112.

At step 1112, the processor 850 creates an outgoing nearby device list message for output via PAN transceiver 854. This outgoing nearby device list message contains data representative of the nearby device list 1120 and can be encoded in a format that is understood by the mobile application 132 and/or remote server that will serve as the destination for the message.

At step 1114, the processor 850 commands the PAN transceiver 854 to wirelessly communicate the outgoing nearby device list message over the PAN according to a PAN protocol for reception by the user's portable computer that executes a mobile application to create the proxy service. This mobile app-based proxy service can then relay the nearby device list data from this message to a remote server over a WAN according to a WAN protocol. The remote server can then use the nearby device list data to update a ratings database that aggregates usage data for a number of different viewers.

In an example embodiment, it should be understood that the PAN transceiver unit 112 can execute the process flows of FIGS. 10 and 11 in tandem. In such a design, the PAN transceiver unit 112 can either send separate usage messages and nearby device list messages or send messages that consolidate both usage data and nearby device data together. Based on the usage data and the nearby device data, the mobile application 132 and/or the remote server can correlate the channel data for the STB with the nearby device data to draw inferences regarding who (and how many people) is/are watching what content on television via their STBs at a given time. For example, correlation of the usage data with the nearby device data can yield an indication of which devices were present for each channel change of the STB. Thus, each channel change of the STB can be associated with a list of devices that were nearby when that channel change occurred.

As an example, if the usage data indicates that the STB was changed to channel "5" at 4 pm on Jan. 1, 2017 and stayed on channel "5" for the next 6 hours, this usage information can be correlated with the nearby device data to better pinpoint how long a viewer may have actually been watching channel "5" during this time. For example, the nearby device data may show that the a device with Device ID "Xyz123" was within range of the PAN on Jan. 1, 2017 from 3:30 pm until 5 pm, at which time its absence was detected. The nearby device data may also show that a device with Device ID "Abc456" was within range of the PAN on Jan. 1, 2017 from 4:30 pm until 5 pm, at which time its absence was detected. This information allows the remote server to draw an inference that a person associated with device "Xyz123" watched the programming on channel "5" on Jan. 1, 2017 from 4 pm until 5 pm while a person associated with device "Abc456" watched the channel "5" programming on Jan. 1, 2017 from 4:30 pm until 5 pm. This information may also reveal that no people may have been watching channel "5" from 5 pm until the channel was changed at 10 pm that night due to the nearby device data showing no nearby devices during that time period. Further still, to the extent the demographic information about the users associated with such devices is made available to the system, the ratings database can also reflect highly specific information about users such as gender, age, etc.

In still further examples, correlation of usage data with nearby device data can yield a number of insights that are useful for assessing television ratings. For example, as mentioned above, the signal strength information in field 1130 of the nearby device data can be used to draw inferences regarding the distance between people associated with those devices and the television (under assumptions that that the STB and PAN transceiver unit are close to the television and the device is closed to its associated person). If the signal strength data indicates a distance within a threshold (e.g., within 15 feet), an inference can be drawn that the person associated with that device is likely viewing the television and playing close attention. If the signal strength data indicates a distance outside a threshold (e.g., outside 30 feet or more), an inference can be drawn that the person associated with that device is likely not paying close attention to the television. Different levels of thresholds can be defined to grade how closely a person might be paying attention to the television as a function of estimated distance based on the signal strength measurement data 1130.

Accordingly, it should be understood that the usage data and nearby device data described herein can support the development of a rich data set regarding television viewing habits by large pools of viewers. Further still, additional post-processing of the usage data and nearby device data can tie devices to specific people and/or demographic information (e.g., age, location, etc.) for those people based on data that associates Device IDs with specific people and/or demographics. Post-processing can also tie time-stamped channel data within the usage data to specific programs via correlation with electronic programming guides that identifies specific programming on specific channels at specific times.

The system illustrated in FIG. 1 can also benefit the customer when the customer has problems with their cable or satellite service or hardware. Generally, when a customer has a problem, the customer calls tech support and tries to debug the problem at the direction of the tech support representative. While the customer can describe the problem, the process can still be frustrating for both parties because the tech support representative cannot actually see the problems occurring on the customer's end.

Using the system shown in FIG. 1, a tech support representative can connect directly to the STB 110 and debug the problem directly. Much like how screen sharing has helped tech support representatives quickly debug computer problems, the system of FIG. 1 allows tech support representatives to debug cable and satellite STB problems remotely. According to the system shown in FIG. 1, the tech support representative can connect to the STB 110 using the customer's computing device 130 as a relay to find and fix problems in the hardware, firmware, or software of the STB 110.

Referring to FIG. 5, a method 500 for connecting a tech support representative to a customer's STB 110 using the customer's computing device 130 and application 132 as a proxy is illustrated. When a customer calls a cable or satellite provider's tech support department, the tech support representative will request to connect to the STB 110 and see if he or she can diagnose the problem. Upon the customer's consent, the tech support representative's computer sends a message to the customer's computing device 130 requesting access to the STB 110 in step 502. The customer can accept the tech support representative's access through the application 132.

The computing device 130 can connect or reconnect to the STB 110 through the PAN 120 in step 504. In many cases, the computing device 130 may already be connected to the STB 110. Assuming the computing device 130 has connected to the STB 110 through the PAN 120 previously, the customer only has to bring the computing device 130 into the range of the STB 110 for a reconnection process to happen automatically.

Once connected, the computing device 130 can relay messages to the STB 110 at the behest of the tech support representative in step 506. The STB 110 may respond with error messages, warnings, or status messages indicating the current status of the STB 110 in response to the messages relayed through the computing device 130 in step 508. The computing device 130 can relay those status messages from the STB 110 to the tech support representative's computer in step 510. This process may involve reassembling messages according to the PAN 120 protocol, and generating data packets according to the WAN 140 protocol. Using the status messages, the tech support representative can diagnose the problem and hopefully fix the problem by sending update messages, messages that reset the STB 110, or any other debugging commands. In this way, the computing device 130 acts as a relay between the STB 110 and the tech support representative's computer so that the customer does not need to perform any problem solving or debugging actions.

By using the system illustrated in FIG. 1 and the method illustrated in FIG. 5, customer problems with their cable or satellite STB 110 can be diagnosed and fixed remotely by a tech support representative. Such a remote access problem solving tool provides the customer with additional convenience and likely fixes problem faster than conventional tech support solutions.

It should be noted that this WAN and PAN connection proxy is not limited to cable and satellite television applications. For example, using a computing device's PAN and WAN connections, a vehicle could connect to the WAN. Many modern vehicles now have BLE hardware so that drivers can stream music or other audio streams through their computing device over the Bluetooth wireless connection. By leveraging this BLE connection between a vehicle and a computing device, the vehicle be can communicate with other digital devices. For example, driving habits or maintenance requests may be sent to a server from the car.

For example, a car could send a message to a dealership notifying the dealer that the vehicle needs an oil change, and the dealership could respond with an oil change coupon message to the driver of the vehicle. Such a coupon not only reminds the driver that the vehicle needs an oil change, but hopefully the coupon saves the driver money on maintenance costs. In another example, the vehicle could report if it has been in an accident through the computing device. As can be seen by the vehicle example, combining the benefits of PAN and WAN connections that a computing device is able to utilize provides benefits in many different industries, including vehicles and satellite television.

Accordingly, it should be understood that the proxy service described herein can be used in combination with a number of devices to link those devices with remote servers, including consumer devices such as meters (e.g., electric meters, gas meters, water meters, etc.), home appliances (e.g. refrigerators, microwaves, thermostats, etc.), radios, Blu-ray players, etc. (as well as STBs, televisions, and vehicles as discussed above).

Figure 12A:
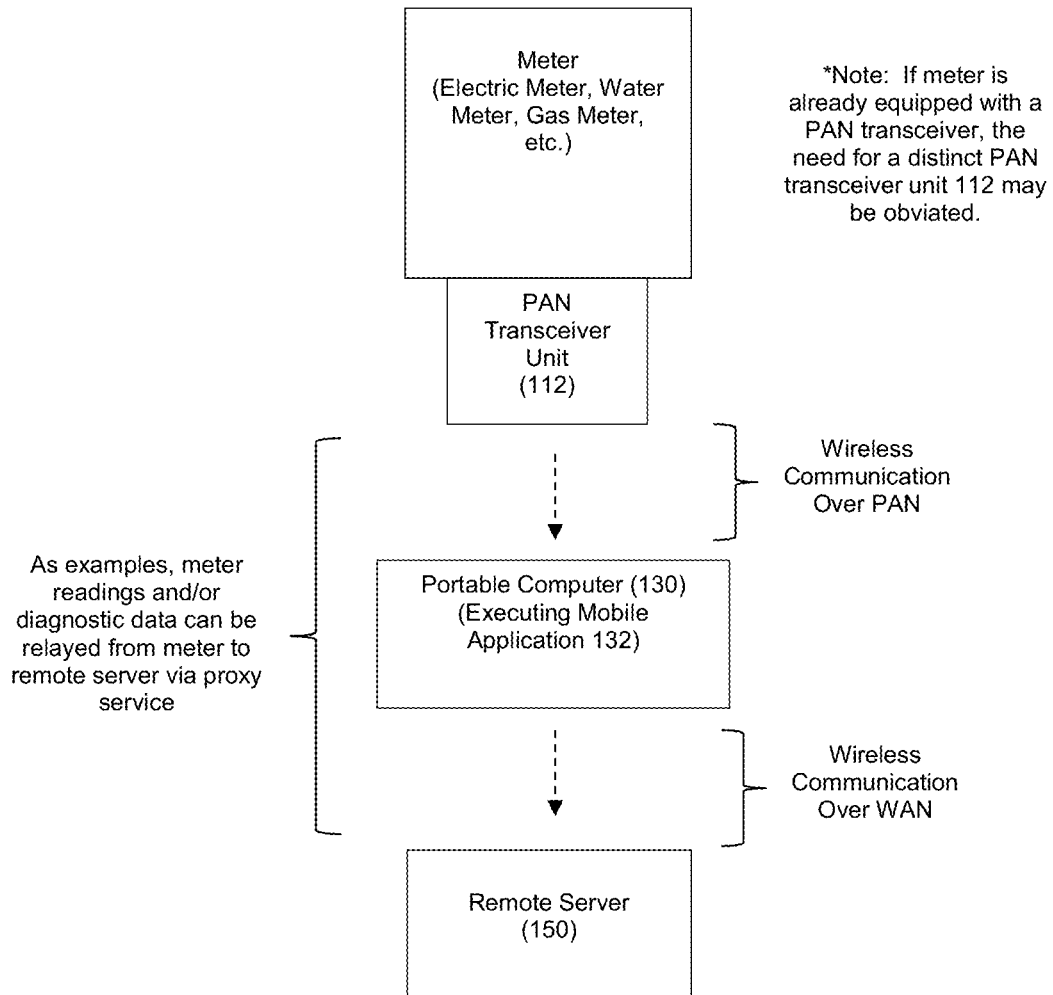
FIGS. 12A-C illustrate example embodiments where various devices communicate with a remote server via the proxy service described herein.

For example, in an example embodiment where the consumer device is a meter such as a gas meter for a home, the meter can be designed to include a PAN transceiver or be connectable with a PAN transceiver unit as described herein to support the communication of data from the meter to a remote server via the mobile app-based proxy service, as shown by FIG. 12A. In this fashion, meter readings can be performed remotely when a user's portable computer equipped with the mobile application 132 comes within range of the PAN created by the PAN transceiver associated with the meter. Further still, as indicated above, the proxy service can provide a communication path for tech support operations. For example, if the meter reader is configured to generate error codes for diagnosing error conditions or malfunctions, the proxy service can operate to relay these error codes to a remote server to provide a technician with an opportunity to diagnose the problem with the meter before arriving for a service visit. Further still, the proxy service can be used as a communication path for sending instructions or data (e.g., software or firmware updates, enable/disable service commands) to the meter from the remote server.

Figure 12B:
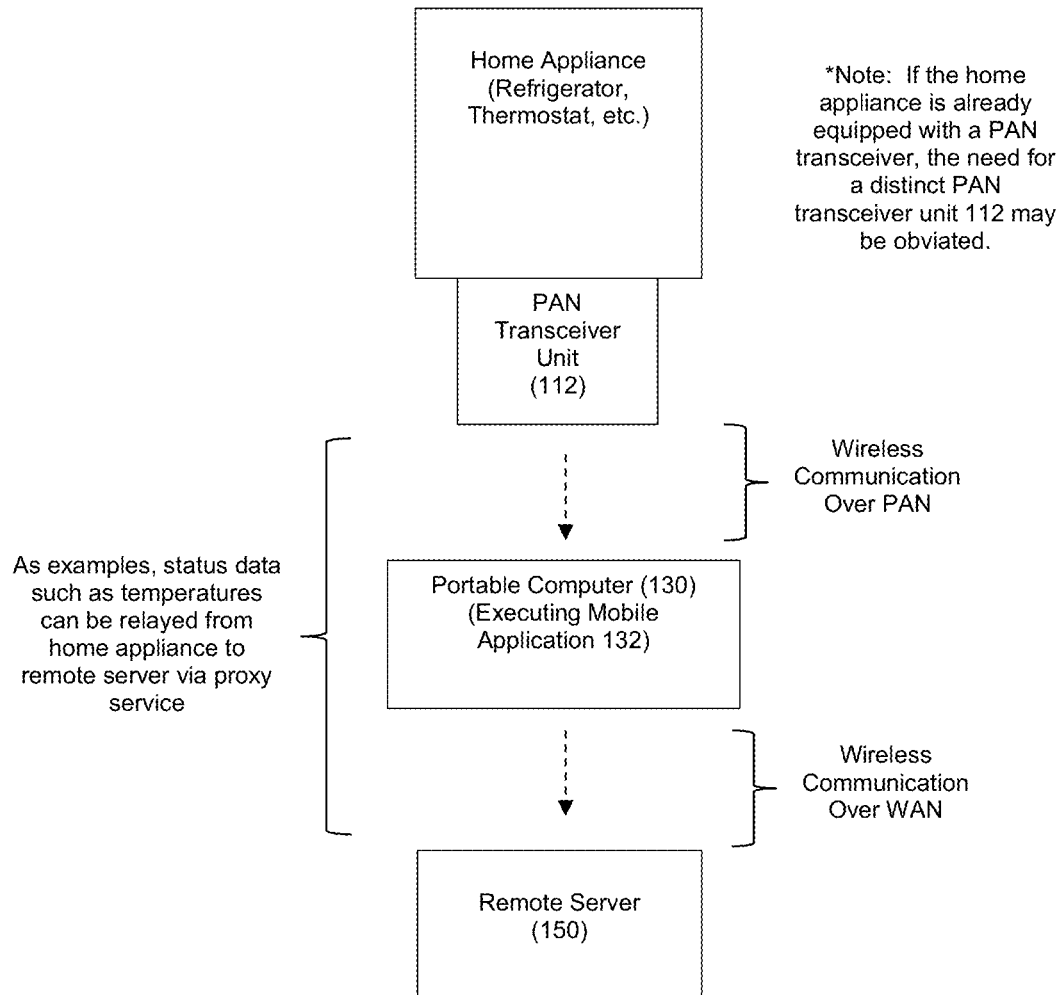

In another example embodiment where the consumer device is a home appliance such as a refrigerator or a thermostat, communications such as those discussed above in connection with STBs, vehicles, and meters can be enabled via the proxy service. For example, status information about the refrigerator (e.g., temperature) can be periodically sent from the refrigerator to a remote server via the proxy service (see FIG. 12B).

Figure 12C:
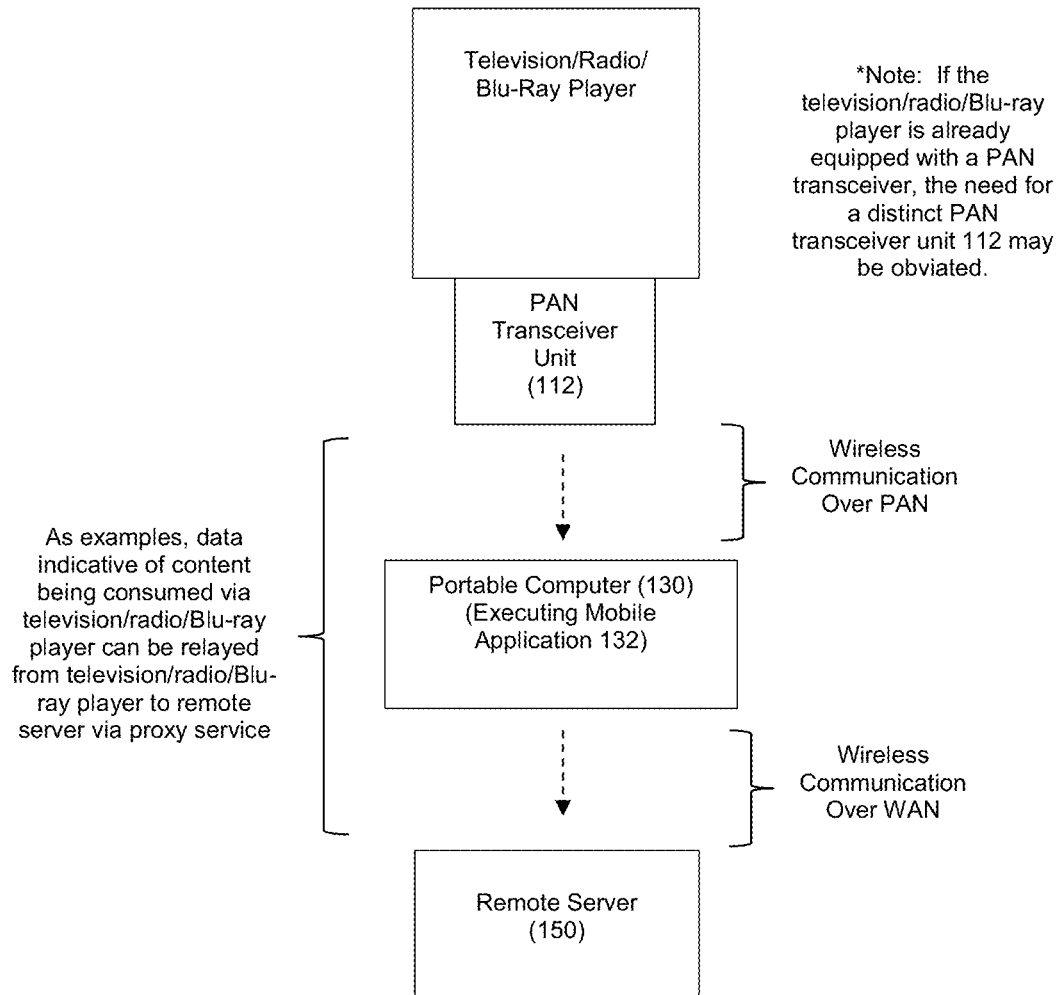

In another example embodiment where the consumer device is a radio, television, or Blu-ray player, communications such as those discussed above in connection with STBs, vehicles, and meters can be enabled via the proxy service. For example, data indicative of the content being played through the radio, television, or Blu-ray player can be periodically sent from the radio, television, or Blu-ray player to a remote server via the proxy service in a manner similar to that discussed above in connection with STBs (see FIG. 12C). For example, if a subject television is capable of playing video from a streaming service (e.g., Netflix), data indicative of such viewing information can be communicated from the television to a remote server via the proxy service.

Figure 13A:
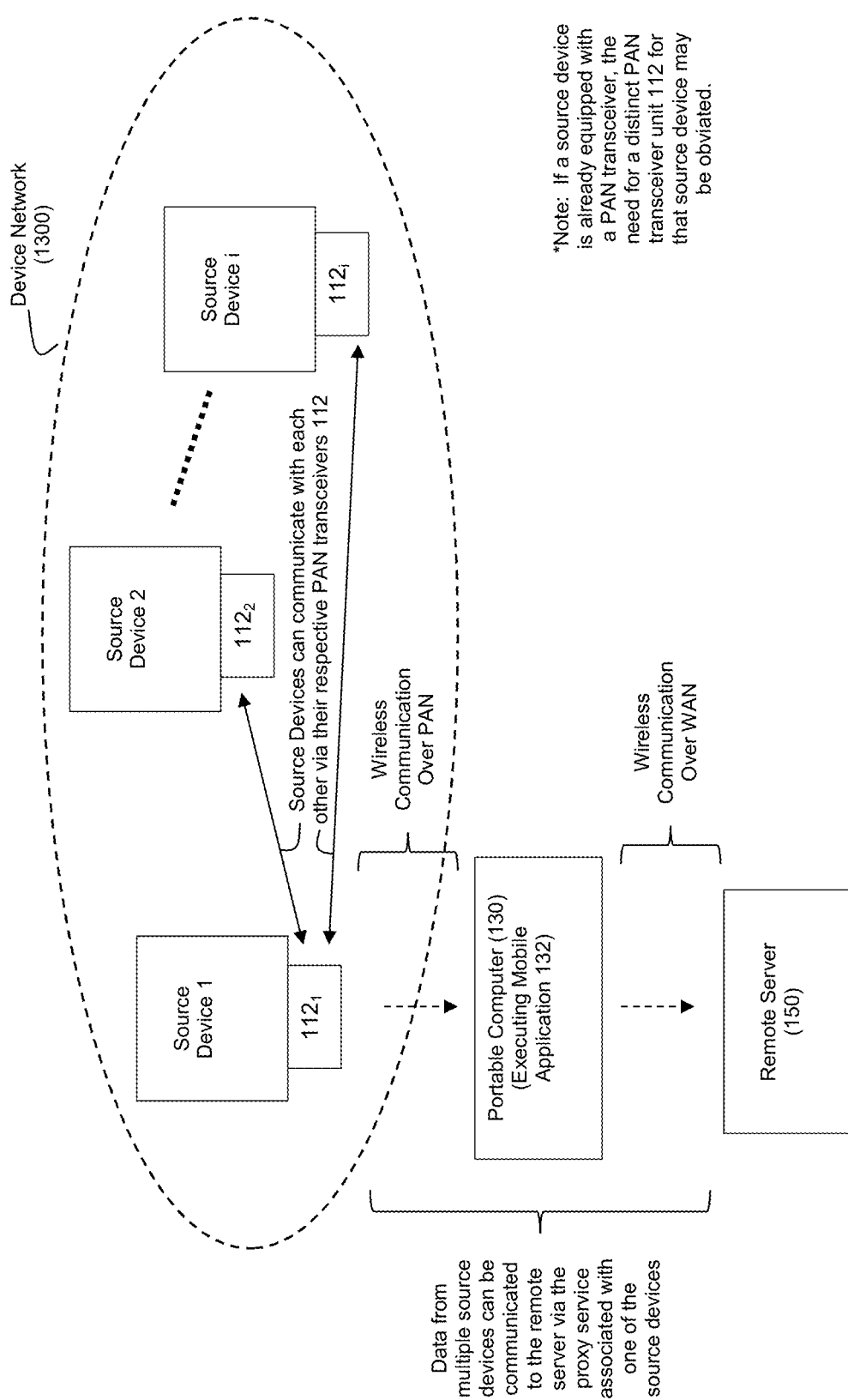
FIGS. 13A and 13B illustrate example embodiments where networks of source devices communicate with other via PAN transceivers and with a remote server via the proxy service described herein.
Figure 13B:
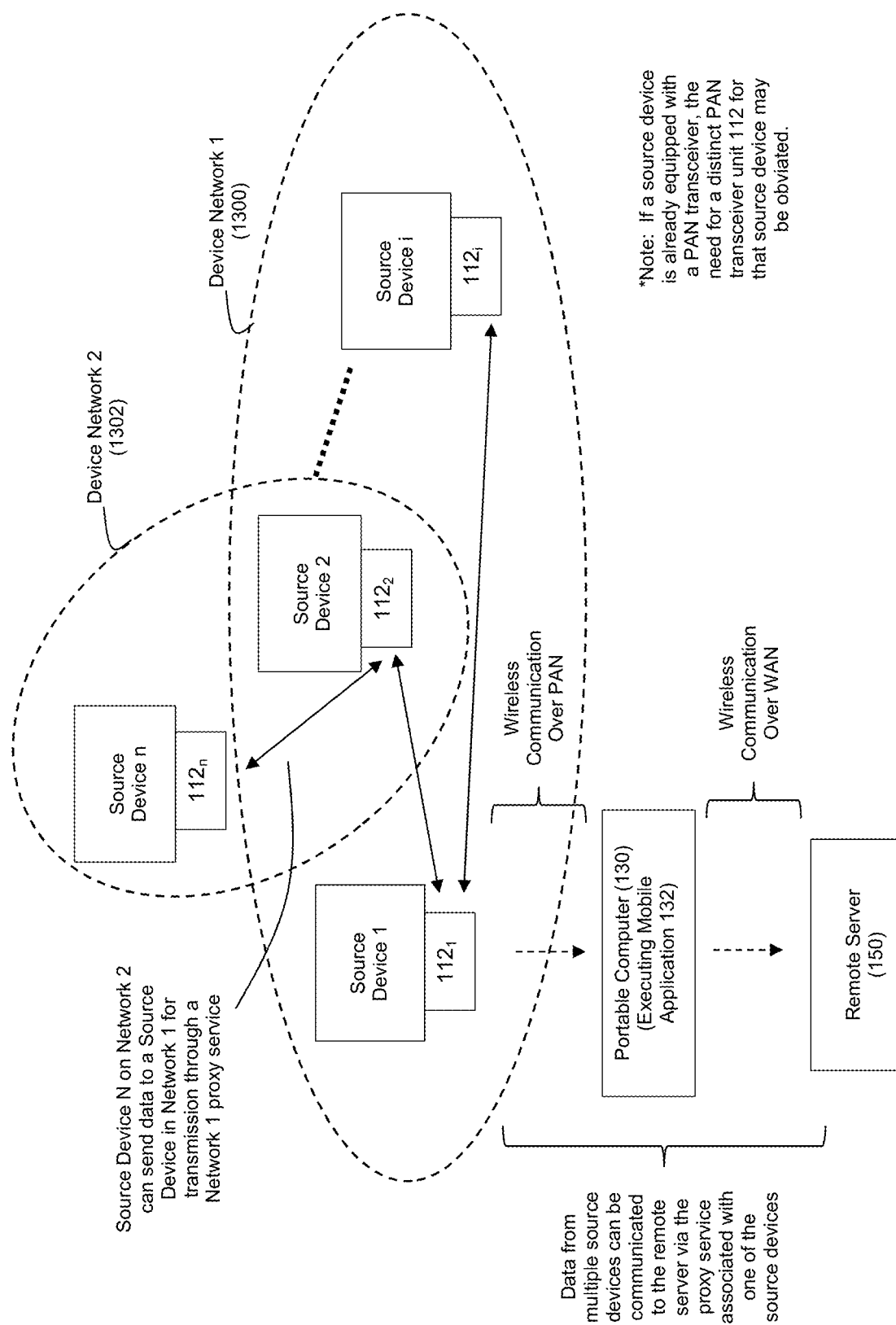

Further still, as shown by example embodiments of FIGS. 13A and 13B, source devices such as meters, STBs, home appliances, etc. can be networked with each other via their PAN transceivers, and then any of these PAN transceivers can communicate with a remote server via the proxy service described herein so that any source device that is networked with another source device can leverage a proxy service accessible to any of the source devices within the source device network to communicate with a remote server.

For example, FIG. 13A shows an example embodiment where a number of source devices form a device network 1300 via their respective PAN transceivers 112. As an example, the source devices can be gas meters. Each source device has an associated PAN transceiver 112 through which the source devices can form a PAN network of source devices 1300. Continuing with the gas meter example, it can be safely assumed that in most urban and suburban areas, the gas meters of homes in that area will be sufficiently close to each other so that a PAN transceiver such as a WiFi transceiver can provide a suitable mechanism for linking the gas meters via device network 1300. For example, if a WiFi PAN transceiver is capable of providing a WiFi signal range of around 500 feet, it can be safely assumed that most gas meters within most urban areas or suburban areas will be within 500 feet of another gas meter. The source devices can communicate information to other PAN transceivers 112 within the device network 1300. Then, when a portable computer 130 with the mobile application 132 for creating the proxy service comes within range of its associated PAN transceiver 112, the proxy service that gets created can serve as the communication path for sending/receiving information with respect to any of the source devices within network 1300. Continuing with the gas meter example, consider a scenario where the homeowners who live in the homes where Gas Meter 2 (Source Device 2 in FIG. 13A) and Gas Meter i (Source Device i in FIG. 13A) are located are out of town for 2 weeks. During this time, the smart devices of these homeowners will likely not be in proximity to PAN transceivers $112_2$ and $112_1$ in which case those smart devices will not be present to create the proxy service for communicating meter readings from the gas meters to a remote server. However, if the homeowner for the home where Gas Meter 1 (Source Device 1 in FIG. 13A) is located is home during this time, the smart device of that home owner can create a proxy service with PAN transceiver $112_1$ of Source Device 1. When this proxy service is created, PAN transceiver $112_1$ can poll the other PAN transceivers 112 within network 1300 to ask for meter readings, which allows for meter readings from Source Device 2 and Source Device i to be communicated from Source Devices 2 and i via their respective PAN transceivers $112_2$ and $112_i$ to the PAN transceiver $112_1$ for Source Device 1. In this fashion, a given proxy service can communicate data to/from multiple source devices that communicate with each other over network 1300.

This architecture can also be used to mesh source devices together that may not share the same device network. An example of this is shown by FIG. 13B. FIG. 13B shows a device network 1300 that can operate as described above in connection with FIG. 13A. However, one of the source devices within network 1300 can also be a member of a different device network 1302 (see Source Device 2 in FIG. 13B). Because Source Device 2 serves as a node that is common to both networks 1300 and 1302, it can be seen that the proxy service through which PAN transceiver unit $112_1$ communicates with the remote server 150 can also provide a communication path for data coming from or going to any of the source devices within network 1302 (e.g., Source Device n). Thus, continuing with the gas meter example, even if Gas Meter n (Source Device n) is too far from Source Device 1 to be within communication range of PAN transceiver $112_1$, data from Gas Meter n can still be communicated to remote server 150 via PAN transceiver $112_1$ and its associated proxy service because Gas Meter 2 (Source Device 2) is within range of Gas Meter n.

In view of the foregoing, it will be seen that the several advantages of the invention are achieved and attained.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "receiving" or "establishing" or "connecting" or "sending" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A system for collecting viewership information about media content presented for display via a set top box (STB) using a portable computing device, the system comprising:
a personal area network ("PAN") transceiver unit for use in relation to the STB, wherein the PAN transceiver unit is configured to be a member of a first wireless network, wherein the first wireless network comprises a wireless PAN, the PAN transceiver unit comprising a processor and a memory, wherein the PAN transceiver unit's processor and memory are configured to (1) collect channel information for the STB that is indicative of media content for viewing by a viewer through the STB and a screen, (2) detect any devices that are observable on and within range of the wireless PAN, (3) record in the memory viewership data that is indicative of a count of the detected devices in association with the collected channel information that is coincident in time with the detected devices, and (4) output the viewership data via the wireless PAN; and
a mobile application comprising a plurality of instructions for execution by a processor of the portable computing device; and
wherein the mobile application, upon execution by the portable computing device's processor, is configured to (1) connect to the wireless PAN, (2) connect to a second wireless network, (3) create a proxy service (i) through which there is a first communication path between the PAN transceiver unit and the mobile application via the wireless PAN and (ii) through which there is a second communication path between the mobile application and a server via the second wireless network, and (4) communicate the viewership data to the server via the proxy service such that the mobile application receives the viewership data from the PAN transceiver unit via the wireless PAN and forwards the viewership data to the server via the second wireless network.

2. The system of claim 1 wherein the viewership data includes identifying information about the detected devices.

3. The system of claim 2 wherein the viewership data further includes device type information for the detected devices.

4. The system of claim 3 wherein the detectable devices include smart phones, tablet computers, and health monitoring wearables, and wherein the device type information includes identifications of the detected devices as being a smart phone, tablet computer, and health monitoring wearable as applicable.

5. The system of claim 3 further comprising the server, wherein the server is configured to store the viewership data in a database, and wherein the database is further configured to link the identifying information and device type information for a plurality of the detected devices within the viewership data with demographic information about users of those detected devices.

6. The system of claim 5 wherein the mobile application, upon execution by the portable computing device's processor, is further configured to obtain demographic information about users of the detected devices.

7. The system of claim 3 wherein the processor and memory of the PAN transceiver unit are further configured to track a signal strength for each detected device, and wherein the viewership data includes data indicative of how close each detected device is to the STB when the STB is on a channel in the collected channel information.

8. The system of claim 2 wherein the PAN transceiver unit is capable of detecting both observable devices that are registered with the wireless PAN and observable devices that are unregistered with the wireless PAN.

9. The system of claim 2 wherein the viewership data comprises time-stamped data indicative of the collected channel information in association with the identifying information about the detected devices.

10. The system of claim 9 wherein the time-stamped channel information comprises channel change information for the STB.

11. The system of claim 9 wherein the PAN transceiver unit's processor and memory are further configured to (1) time-stamp detection of new devices on the wireless PAN and (2) time-stamp disconnection of detected devices from the wireless PAN, and wherein the viewership information further comprises data indicative of a time duration for the detected devices being connected to the wireless PAN in association with the time-stamped collected channel information.

12. The system of claim 2 wherein the mobile application, upon execution by the portable computing device's processor, is further configured to pair the portable computing device with the PAN transceiver unit via the wireless PAN when the portable computing device is within range of the PAN transceiver unit.

13. The system of claim 12 wherein the PAN transceiver unit's processor and memory are further configured to condition output of the viewership data to the portable computing device via the wireless PAN based on the portable computing device pairing itself with the PAN transceiver unit.

14. The system of claim 13 wherein the PAN transceiver unit's processor and memory are further configured to condition output of the viewership data to the portable computing device via the wireless PAN based on (1) the portable computing device pairing itself with the PAN transceiver unit and (2) the PAN transceiver unit's determining from its memory that the paired portable computing device has the proxy service.

15. The system of claim 14 wherein the mobile application, upon execution by the portable computing device's processor, is further configured to advertise a unique identifier via the wireless PAN, wherein the unique identifier establishes the portable computing device as being registered to pair with the wireless PAN and having the proxy service.

16. The system of claim 2 further comprising the server, the STB, and the portable computing device, and wherein the second wireless network comprises a wireless wide area network.

17. The system of claim 1 wherein the STB is a satellite television STB.

18. The system of claim 1 wherein the collected channel information corresponds to live media content for viewing via the STB.

19. The system of claim 1 wherein the PAN transceiver unit's processor and memory are further configured to (1) collect STB interaction data that comprises at least one of volume changes, start recording requests, and/or end recording requests for the STB and (2) include the collected STB interaction data with the viewership data.

20. The system of claim 1 wherein the wireless PAN comprises a Bluetooth BLE network.

21. The system of claim 1 wherein the PAN transceiver unit is configured for connection with the STB and receives the channel information from the STB.

22. The system of claim 20 wherein the PAN transceiver unit is capable of detecting observable devices that are within range of the Bluetooth BLE network independently of any registration process for pairing the observable devices with the PAN transceiver unit via the Bluetooth BLE network.

23. The system of claim 22 wherein the PAN transceiver unit is capable of detecting both observable devices that are registered with the Bluetooth BLE network and observable devices that are unregistered with the Bluetooth BLE network.

24. The system of claim 23 wherein the mobile application, upon execution by the portable computing device's processor, is further configured to advertise a unique identifier via the Bluetooth BLE network, wherein the unique identifier establishes the portable computing device as being registered to pair with the Bluetooth BLE network and having the proxy service.

25. The system of claim 24 wherein the PAN transceiver unit's processor and memory are further configured to condition output of the viewership data to the portable computing device via the Bluetooth BLE network based on the portable computing device pairing itself with the PAN transceiver unit.

26. The system of claim 4 wherein the server is further configured to draw inferences about how many persons are presumed to be present in the viewership data based on the count and the device type information for the detected devices.

27. The system of claim 26 wherein the processor and memory of the PAN transceiver unit are further configured to track a signal strength for each detected device, wherein the viewership data includes data indicative of how close each detected device is to the STB when the STB is on a channel in the collected channel information, and wherein the server is further configured to draw inferences about how many persons are presumed to be present in the viewership data based on the count, the device type information, and the tracked signal strengths for the detected devices.

28. The system of claim 21 wherein the PAN transceiver unit is configured for detachable connection with the STB.

29. The system of claim 1 wherein the portable computing device comprises a smart phone, wherein the proxy service created by the mobile application leverages an existing data service plan from a carrier for the smart phone to communicate the viewership data from the PAN transceiver unit to the server (i) without leveraging a tethering plan from the carrier for the smart phone to provide a path for communicating the viewership data from the PAN transceiver unit to the server and (ii) without making any phone calls.

* * * * *